United States Patent
Zhang et al.

(10) Patent No.: US 9,661,329 B2
(45) Date of Patent: May 23, 2017

(54) CONSTANT QUALITY VIDEO CODING

(71) Applicant: Intel Corporation, Santa Clara, CA (US)

(72) Inventors: Ximin Zhang, San Jose, CA (US); Sang-Hee Lee, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 14/265,580

(22) Filed: Apr. 30, 2014

(65) Prior Publication Data

US 2015/0319437 A1   Nov. 5, 2015

(51) Int. Cl.
| | |
|---|---|
| *H04N 19/124* | (2014.01) |
| *H04N 19/172* | (2014.01) |
| *H04N 19/176* | (2014.01) |
| *H04N 19/196* | (2014.01) |
| *H04N 19/159* | (2014.01) |
| *H04N 19/14* | (2014.01) |

(52) U.S. Cl.
CPC .......... *H04N 19/124* (2014.11); *H04N 19/14* (2014.11); *H04N 19/159* (2014.11); *H04N 19/172* (2014.11); *H04N 19/176* (2014.11); *H04N 19/197* (2014.11)

(58) Field of Classification Search
CPC .................................................. H04N 19/124
USPC ................................................... 375/240.03
See application file for complete search history.

(56) References Cited

U.S. PATENT DOCUMENTS

| | | | | |
|---|---|---|---|---|
| 6,765,962 | B1 * | 7/2004 | Lee ..................... | H04N 19/197 375/240.03 |
| 2011/0310963 | A1 * | 12/2011 | Yang ................... | H04N 19/172 375/240.03 |
| 2012/0026394 | A1 * | 2/2012 | Maruyama ............ | H04N 19/14 348/465 |
| 2013/0128963 | A1 * | 5/2013 | Leontaris ......... | H04N 19/00569 375/240.12 |
| 2013/0188689 | A1 | 7/2013 | Garbacea et al. | |
| 2013/0279567 | A1 * | 10/2013 | Brailovskiy ......... | H04N 19/172 375/240.03 |
| 2013/0336593 | A1 | 12/2013 | Yamamura et al. | |
| 2013/0343665 | A1 | 12/2013 | Maeda | |
| 2014/0086313 | A1 | 3/2014 | Zheng et al. | |

OTHER PUBLICATIONS

International Search Report and Written Opinion mailed Jun. 18, 2015 for PCT Application No. PCT/US2015/022545.

* cited by examiner

*Primary Examiner* — Christopher S Kelley
*Assistant Examiner* — Jonathan Messmore
(74) *Attorney, Agent, or Firm* — Green, Howard & Mughal LLP

(57) ABSTRACT

Techniques related to constant quality video coding are discussed. Such techniques may include determining a quantization parameter for a frame of a video sequence, modifying the quantization parameter based on a spatial complexity or a temporal complexity associated with the video frame, and generating a block level quantization parameter for a block of the video frame based on the modified frame level quantization parameter, a complexity of the block, and a complexity of the video frame.

25 Claims, 6 Drawing Sheets

300

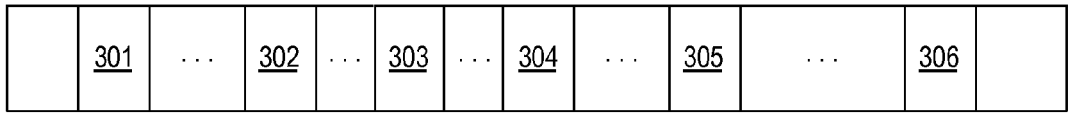

Determine a Quantization Parameter for a Video Frame of a Video Sequence
401

Modify the Quantization Parameter based on a Complexity of the Video Frame to Generate a Second Quantization Parameter for the Video Frame
402

Generate a Block Level Quantization Parameter for a Block of the Video Frame based on the Second Quantization Parameter, a Complexity of the Block, and a Complexity of the Video Frame
403

FIG. 4

CONSTANT QUALITY VIDEO CODING

BACKGROUND

Visual quality is an important aspect of the user experience in many media applications. Furthermore, in compression/decompression (codec) systems, visual quality may be primarily based on the compression format used. For example, a video encoder compresses video information so that more information can be sent over a given bandwidth or stored in a given memory space or the like. The compressed signal or data may then be decoded via a decoder that decodes or decompresses the signal or data for display to a user. In some implementations, constant visual quality may be desirable. Constant visual quality, as its name implies, aims to achieve a fixed subjective quality across video frames or sequences of video frames. Typically, constant visual quality implementations may employ a variable bitrate such that file sizes or the sizes of various portions of a bitstream may be variable depending on factors such as the complexity of the video being compressed.

In one approach, a constant quantization parameter (QP) is used to achieve constant visual quality. For example, transform coefficients obtained via an encoding technique such as the H.264/MPEG-4 Advanced Video Coding (AVC) standard or the High Efficiency Video Coding (HEVC) standard or the like may be quantized using a constant QP. For example, larger QP values provide greater compression at the cost of lesser quality while lower QP values achieve greater visual quality at the cost of lesser compression. However, such constant QP approaches may not fully provide constant visual quality as perceived by users. Furthermore, such constant QP approaches may be wasteful in compressing certain portions of video sequences (either spatially within video frames or temporally across video frames).

As such, existing techniques may not provide constant visual quality for users and/or effective compression. Such problems may become critical as the transmission of video at ever higher quality becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 illustrates an example bitstream;

FIG. 4 is a flow diagram illustrating an example process for providing video coding with constant visual quality;

DETAILED DESCRIPTION

Figure 1:
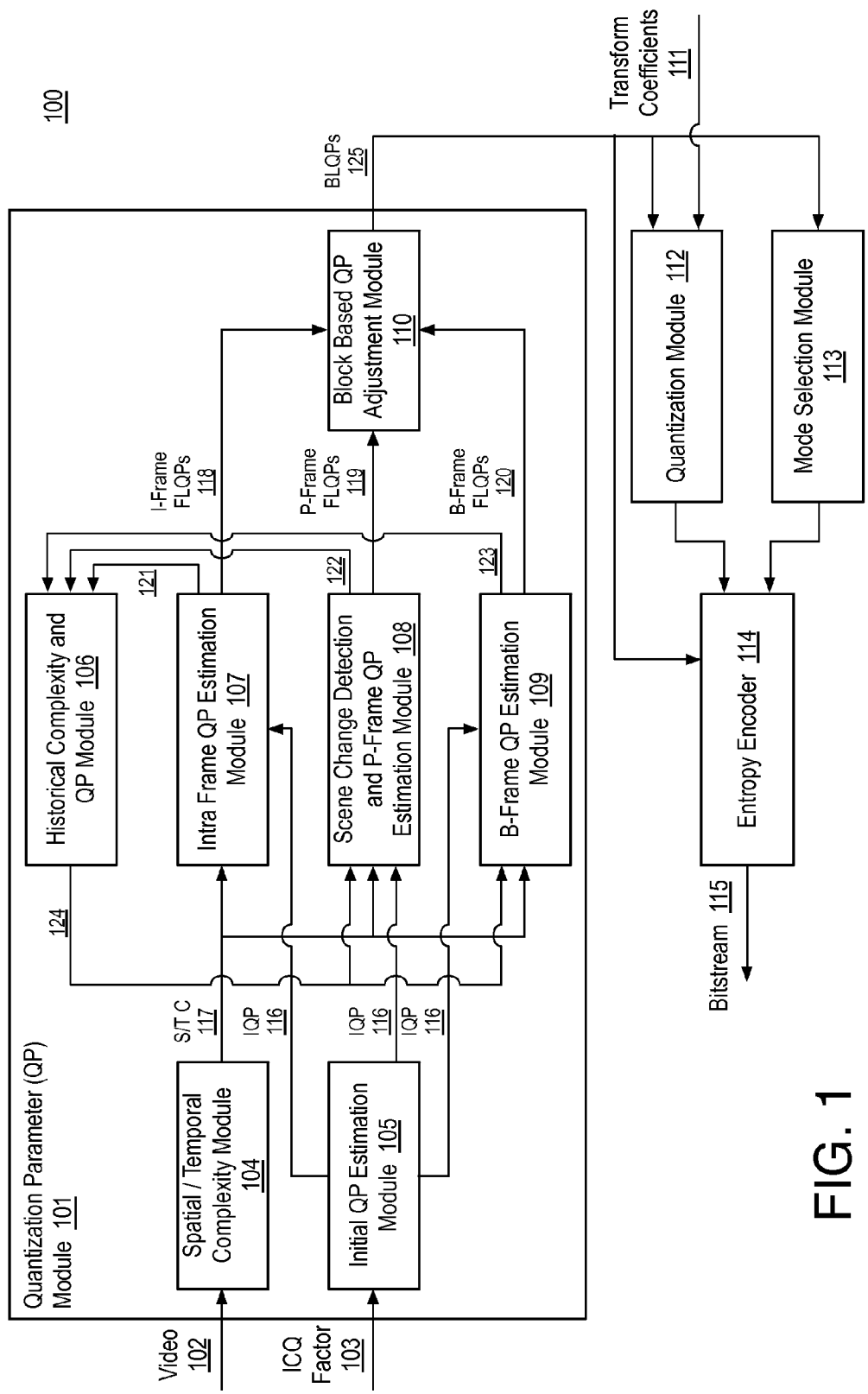
FIG. 1 is an illustrative diagram of an example system for providing video coding with constant visual quality.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to constant quality video coding.

As described above, it may be advantageous to provide substantially constant visual quality in many video coding implementations. Also as discussed, constant quantization parameter (QP) approaches may not fully provide constant visual quality and may be wasteful in compressing certain portions of video sequences. Such approaches may not consider characteristics of the human visual system (HVS). For example, the human visual system may be more sensitive to video scenes that have substantially stationary or slow moving objects and less sensitive to fast moving or complicated video scenes. In the discussed constant QP approaches, fast moving or complicated video scenes and video scenes having slower motion are quantized using the same QP, which may be wasteful since fast moving or complicated video scenes may be further compressed (e.g., with a larger QP) without notice to a user. Similarly, greater quality may be provided by providing less compression to slow moving video scenes to which a user may be more sensitive to compression artifacts or may appreciate greater quality video or the like.

The techniques discussed herein may provide for better subjective video quality as compared to constant QP techniques and may provide better subjective video quality with similar or lower bitrates. As discussed further herein, frame level spatial complexity and/or temporal complexity are used to adjust frame level QPs. The frame level QPs may be further modified or used to generate block level QPs (e.g. QPs for blocks of a video frame) using an HVS-based analysis. The frame level and block level adjustments to the QP may provide smaller QPs (e.g., with less compression and greater quality) in areas that are sensitive to the HVS and larger QPs (e.g., with greater compression and lower quality) to areas that are less sensitive to the HVS.

In some embodiments, video coding may include determining a quantization parameter for a video frame. The quantization parameter may be based on a user selection for quality and/or the quantization parameter may be modified based on the frame type (e.g., intra, predicted, or bi-directional). The quantization parameter may be an initial or reference quantization parameter, for example. In some embodiments, the quantization parameter may be modified or adjusted based on modified quantization parameter(s) of previous frames. The quantization parameter for the video frame may be modified based on a spatial complexity associated with the video frame, a temporal complexity associated with the video frame, or both to generate a modified (or second) quantization parameter for the video frame. The modified or second quantization parameter may be a frame level quantization parameter for the video frame, for example. A block level quantization parameter may be generated for an individual block of the video frame based on the frame level quantization parameter, a complexity of the individual block, and the complexity of the video frame. For example, the complexity of the individual block may be a block prediction distortion of the individual block, a block variance of the individual block, or a combination thereof and the complexity of the video frame may be an average of the block variances for all the blocks of the video frame, an average of the block prediction distortions for all the blocks of the video frame, or a combination thereof. Such a process may be repeated for all blocks of a video frame to generate a plurality of block level quantization parameters.

The block level quantization parameters may be used to quantize transform coefficients associated with the blocks and the quantized transform coefficients and block level quantization parameters may be encoded into a bitstream for use at a decoder. The decoder may decompress and/or decode the bitstream to generate reproduced frames for presentment to a user. Furthermore, the block level quantization parameters may be used to generate mode selections associated with the video sequence for use in encoding.

FIG. 1 is an illustrative diagram of an example system 100 for providing video coding, arranged in accordance with at least some implementations of the present disclosure. As shown in FIG. 1, system 100 may include a quantization parameter (QP) module 101, a quantization module 112, a mode selection module 113, and an entropy encoder module 114. Also as shown, QP module 101 may include a spatial/temporal complexity module 104, an initial QP estimation module 105, a historical complexity and QP module 106, an intra frame QP estimation module 107, a scene change detection and predicted (P) frame QP estimation module 108, a bi-directional (B) frame QP estimation module 109, and a block based QP adjustment module 110.

Also as shown, QP module 101 may receive a video 102 and an intelligent constant quality (ICQ) factor 103 and entropy encoder module 114 may provide or transmit a bitstream 115. System 100 may provide, for example, video compression and system 100 may be a video encoder implemented via a computer or computing device or the like. For example, system 100 may generate bitstream 115 that is compatible with a video compression-decompression (codec) standard such as the H.264/MPEG-4 Advanced Video Coding (AVC) standard or the High Efficiency Video Coding (HEVC) standard or the like.

System 100 may include other modules not shown for the sake of clarity of presentation. For example, system 100 may include a transform module, an intra prediction module, a motion estimation module, a motion compensation module, an in-loop filtering module, a reference frame buffer, a scanning module, or the like. In some examples, system 100 may include a local decode loop for generating reference frames used in the encoding process. Such modules are known to those of skill in the art and are not discussed further herein for the sake of clarity in presenting the described techniques.

As discussed, QP module 101 may receive video 102 and ICQ factor 103. Video 102 may include any suitable video frames, sequence of video frames, video data, or the like in any suitable resolution. For example, video 102 may be video graphics array (VGA), high definition (HD), Full-HD (e.g., 1080p), or 4K resolution video, or the like. Furthermore, video 102 may include any number of video frames, sequences of video frames, or scenes or the like. Frame selections and/or mode selections (not shown) may be made for video 102 such that video frames of video 102 may each be designated with a frame type. The frame types may include any suitable frame type or types, which may be defined by a standard or a protocol or the like. For example, the frame types may include intra frames (I-frames) predicted without reference to another frame or frames, predicted frames (P-frames) predicted with reference to another frame or frames and available for use in prediction of other frames, bi-directional frames (B-frames) predicted with reference to another frame or frames but not available for use in prediction of other frames, and/or reference bi-directional frames (B-reference frames) predicted with reference to another frame or frames and available for use in prediction in hierarchical coding structures. In some examples, P-frames, B-frames, and B-reference frames may be considered inter frames. For example, in the AVC standard, I-frames, P-frames, B-frames, and B-reference frames may be available. In the HEVC standard, the frame type may be related to a reference depth level when hierarchical coding is enabled.

ICQ factor 103 may include any indication of a video quality (e.g., a desired or required video quality or the like). For example, ICQ factor 103 may be set by or determined by a user, a system parameter of system 100, a quality of a communications connection to system 100, or the like. In an embodiment, ICQ factor 103 is based on a user selected constant quality factor for video 102. The user selected constant quality factor may be any suitable selection such as an integer value, a subjective quality selection, a selection based on a slider having a quality range presented to the user, or the like. In an embodiment, a subjective selection may be made (e.g., high, medium, or low quality) and system 100 may translate the subjective selection to an integer value for ICQ factor 103. For example, ICQ factor 103 may range from 1 to 51 with values of about 20 to 26 providing medium quality video, values of about 27 to 31 providing low quality video, and values of about 15 to 19 providing high quality video, although any values and/or ranges may be used.

As used herein, a low ICQ factor 103 and low QPs are associated with higher video quality and higher bitrates and a high ICQ factor 103 and high QPs are associated with lower video quality and lower bitrates. For example, a user or system or the like may provide a low ICQ factor 103 when good or higher quality video is desired despite a cost of a higher bitrate (e.g., less compression) and a high ICQ factor 103 when lower quality video may be tolerated such that a lower bitrate (e.g., more compression may be achieved). Also as used herein, ICQ factor 103 may be described as a constant quality factor.

Continuing with FIG. 1, initial QP estimation module 105 may determine or generate initial quantization parameter (IQP) value(s) 116 for frames of video 102. For example, initial QP values 116 may include initial estimations of frame level QP values for frames of the entirety of video 102 or for a sequence of video 102 (e.g., a portion of video 102, a scene of video 102, or the like). In an example, initial QP value 116 for a video frame of video 102 may be based on ICQ factor 103. In an example, initial QP value 116 for a video frame of video 102 may be equal to ICQ factor 103. In another example, initial QP value 116 for a video frame of video 102 may be based on ICQ factor 103 and a frame type based offset. For example, frame type offsets based on the frame type (e.g., I-frame, P-frame, B-frame, or B-reference frame) may be made to ICQ factor 103 as shown in Equations (1)-(3).

$$\text{Initial\_QP}(I) = \text{ICQ Factor} \quad (1)$$

$$\text{Initial\_QP}(P) = \text{Initial\_QP}(I) + \text{Offset}P(\text{ICQ Factor}) \quad (2)$$

$$\text{Initial\_QP}(B) = \text{Initial\_QP}(I) + \text{Offset}B(\text{ICQ Factor}) \quad (3)$$

where ICQ Factor may be ICQ factor 103, Initial_QP may be an initial QP value (e.g., initial QP value 116), Initial_QP (I) may be an initial QP value for an I-frame, Initial_QP (P) may be an initial QP value for a P-frame, Initial_QP (B) may be an initial QP value for a B-frame (e.g., a B-frame or a B-reference frame), OffsetP may be a frame type based offset for a P-frame, and OffsetB may be a frame type based offset for a B-frame.

As shown in Equations (2) and (3), OffsetP and OffsetB may be functions of the ICQ factor. The functions may include any suitable functions (e.g., linear, step, logical or the like) that provide an offset based on the ICQ factor. For example, OffsetP may provide an integer value in the range of 0 to 4 with a higher offset being provided for lower ICQ factor values. For example, OffsetB may provide an integer value in the range of 2 to 8 with a higher offset being provided for lower ICQ factor values. Also, as shown in Equation (1), in some examples, Initial_QP (I) may be determined without an offset or with an offset of zero. In other examples, Initial_QP (I) may be determined with an offset function in analogy to those shown in Equations (2) and (3) (e.g., an OffsetI(ICQ Factor) or the like).

As shown in FIG. 1, spatial/temporal complexity module 104 may receive video 102 and may generate, for frames of video 102, spatial and/or temporal complexity (S/T C) values 117 for the frames. The spatial complexity may be determined using any suitable technique that provides a measure of the spatial complexity of a video frame of video 102. In an embodiment, the spatial complexity is estimated based on the intra prediction distortion of a video frame of video 102. Furthermore, the temporal complexity for a video frame of video 102 may be determined using any suitable technique that provides a measure of the temporal complexity of a video frame. In an embodiment, the temporal complexity is estimated based on the inter prediction distortion of a video frame of video 102. In various examples, the measure of intra prediction distortion, inter prediction distortion, or both may be based on a statistical measure such as a sum of absolute differences (SAD), a summation of distortion, or the like. In some examples, the intra prediction distortion, the inter prediction distortion, or both may be determined based on a down-sampled version of a video frame of video 102. For example, a frame of video 102 may be down-sampled or down-scaled by a factor of 2, 4, or 8, or the like prior to the determination of the intra prediction distortion, the inter prediction distortion, or both for the video frame.

Intra frame QP estimation module 107, as shown, may receive spatial and/or temporal complexity values 117 and initial quantization parameter value(s) 116 and may generate I-frame frame level quantization parameters (FLQPs) 118. In some examples, intra frame QP estimation module 107 may receive spatial and/or temporal complexity values 117 and initial quantization parameter value(s) 116 for all frames of video 102 and, in other examples, intra frame QP estimation module 107 may receive only spatial and/or temporal complexity values 117 and initial quantization parameter value(s) 116 associated with I-frames of video 102. In an example, intra frame QP estimation module 107 may modify initial QPs for I-frames (e.g., initial QP values 116 for I-frames) based on one or both of spatial and/or temporal complexity values 117 to generate I-frame FLQPs 118. For example, I-frame FLQPs 118 may be greater than initial QPs for I-frames when the spatial complexity of the I-frame indicates high spatial complexity such that relatively large I-frame FLQPs 118 may be used for frames with high spatial complexity (e.g., when a user may not notice a decrease in quality and compression may be increased) and relatively small I-frame FLQPs 118 may be used for frames with low spatial complexity (e.g., when higher quality may be beneficial to a user). In some examples, high spatial complexity may determined based on an intra prediction distortion and empirically determine constants.

As discussed, in an example, initial QPs for I-frames may be equal to ICQ factor 103 (please refer to Equation (1)). In an embodiment, I-frame FLQPs 118 may be proportional to the spatial complexity of the I-frame. For example, I-frame FLQPs 118 may be determined as shown in Equation (4):

$$QP_{INTRA} = \text{Initial\_QP}(I) \times \text{Distortion}(\text{Intra})^C / \text{Threshold1} \quad (4)$$

where $QP_{INTRA}$ may be an I-frame frame level quantization parameter (e.g., I-frame FLQP 118), Initial_QP (I) may be an initial QP value for an I-frame (as discussed above), Distortion(Intra) may be an intra spatial prediction distortion, C may be an empirically determined constant, and Threshold1 may be an empirically determined constant or threshold value.

As shown in Equation (4), an I-frame frame level quantization parameter may be proportional to the spatial complexity of the I-frame raised to a value, C. C may be any suitable value or constant such as, for example, 1, or any non-integer value. As discussed, C may be empirically determined and may be based on the method used to determine the spatial complexity (e.g., SAD or summation distortion or the like). In some examples, C may be based on the content of video 102 such that C may be adaptive or variable based on video 102.

As shown, I-frame FLQPs 118 may be transmitted from intra frame QP estimation module 107 to block based QP adjustment module for further processing, as is discussed below. Also as shown, via coupling 121, intra frame QP estimation module 107 may transmit, to historical complexity and QP module 106, various data including, for example, I-frame FLQPs 118, any determined spatial complexities, constants or thresholds (e.g., C and/or Threshold1), or the like. After determining I-frame FLQPs 118, for example, the discussed data or portions thereof may be transferred from intra frame QP estimation module 107 to historical complexity and QP module 106 and from historical complexity and QP module 106 to scene change detection and P-frame QP estimation module 108 and/or B-frame QP estimation module 109.

Scene change detection and P-frame QP estimation module 108 may also receive spatial and/or temporal complexity values 117 and initial quantization parameter value(s) 116 (for all frames or only for P-frames) and may generate a reference quantization parameter based on the initial QP value for P-frame(s) (please refer to Equation (2) above), the I-frame FLQP 118 associated with the P-frame(s) (e.g., the FLQP for the I-frame that the P-frame references for coding), the initial QP for I-frames, and/or a weighting factor. For example, in coding a sequence of video 102, one or more P-frames may be coded with reference to a single I-frame. The P-frame reference quantization parameter (QP) may be based on a constant quality factor for the video sequence increased by an inter P-frame offset (e.g., as shown in Equation (2)) and modified based on the intra frame quantization value associated with it. For example, the P-frame reference QP may be determined as shown in Equation (5):

$$QP_{P\_reference} = \text{Initial\_QP}(P) + (QP_{INTRA} - \text{Initial\_QP}(I)) \times w1 \quad (5)$$

where $QP_{P\_reference}$ may be the P-frame reference QP, Initial_QP (P) may be an initial QP value for a P-frame (as discussed above), $QP_{INTRA}$ may be the I-frame frame level quantization parameter (e.g., I-frame FLQP 118) associated with the P-frame(s), Initial_QP (I) may be an initial QP value for an I-frame (as discussed above), and w1 may be a weighting factor. For example, weighting factor w1 may be any suitable valuable for weighting the contribution for providing video coding with constant visual quality of ($QP_{INTRA}$−Initial_QP (I)) to $QP_{P\_reference}$. In some examples, weighting factor w1 may be in the range of about 0.5 to 1, with a value of 0.9 being particularly advantageous.

Similarly, B-frame QP estimation module 109 may receive spatial and/or temporal complexity values 117 and initial quantization parameter value(s) 116 (for all frames or only for B-frames) and may generate a reference quantization parameter based on the initial QP value for B-frame(s) (please refer to Equation (3) above), the I-frame FLQP 118 associated with the B-frame(s), the initial QP for I-frames, and/or a weighting factor. For example, in coding a sequence of video 102, one or more B-frames (e.g., B-frames and/or B-reference frames) may be coded with respect to (e.g., referencing the I-frame itself or another frame that references the I-frame) a single I-frame. The B-frame reference quantization parameter (QP) may be based on a constant quality factor for the video sequence increased by an inter B-frame offset (e.g., as shown in Equation (3)) and modified based on the intra frame quantization parameter associated with it. For example, the B-frame reference QP may be determined as shown in Equation (6):

$$QP_{B\_reference} = \text{Initial\_QP}(B) + (QP_{INTRA} - \text{Initial\_QP}(I)) \times w2 \quad (6)$$

where $QP_{B\_reference}$ may be the B-frame reference QP, Initial_QP (B) may be an initial QP value for a B-frame (as discussed above), $QP_{INTRA}$ may be the I-frame frame level quantization parameter (e.g., I-frame FLQP 118) associated with the B-frame(s), Initial_QP (I) may be an initial QP value for an I-frame (as discussed above), and w2 may be a weighting factor. For example, weighting factor w2 may be any suitable valuable for weighting the contribution of ($QP_{INTRA}$−Initial_QP (I)) to $QP_{B\_reference}$. In some examples, weighting factor w2 may be in the range of about 0.5 to 1, with a value of 0.9 being particularly advantageous. In some examples, weighting factors w1 and w2 may be the same while, in other examples, they may be different.

Returning to scene change detection and P-frame QP estimation module 108, for each P-frame of video 102, a scene change detection may be applied to determine whether the P-frame is associated with a scene change in video 102 such that the P-frame is a scene change frame. For example, scene change detection and P-frame QP estimation module 108 may determine whether a P-frame is a scene change frame based on the temporal complexity of the frame (e.g., as received via spatial and/or temporal complexity values 117). In an embodiment, a ratio may be determined based on the temporal complexity of the target P-frame and a past average temporal complexity based on past frames (e.g., an average temporal complexity of one or more past frames). The past average temporal complexity may be determined via scene change detection and P-frame QP estimation module 108 or received via historical complexity and QP module 106, which may determine the past average temporal complexity based on data received via couplings 121, 122, 123, as discussed herein. The past average temporal complexity may be determined based on any number of past frames. In an embodiment, the past average temporal complexity is based on the most recent five previous frames (or less if five frames are not available).

The ratio of the temporal complexity of the target P-frame to the past average temporal complexity may be compared to a threshold (e.g. a predetermined or heuristically determined threshold) to determine whether the target P-frame is a scene change frame. In an embodiment, if the ratio is greater than the threshold, the target P-frame is determined to be a scene change frame.

If a P-frame is determined to be a scene change frame, a P-frame frame level quantization parameter (P-frame FLQP) may be determined for the scene change P-frame based on an initial QP for I-frames and the spatial complexity and/or temporal complexity of the target P-frame. In an embodiment, the P-frame FLQP is proportional to the spatial complexity and/or temporal complexity of the target P-frame. For example, the P-frame FLQP may be determined as shown in Equation (7):

$$QP_{P\_scene\_change\_frame}=\text{Initial\_QP}(I)\times\text{Function1}(\text{Distortion}(P)^C/\text{Threshold2}) \qquad (7)$$

where $QP_{P\_scene\_change\_frame}$ may be a scene change P-frame frame level quantization parameter (e.g., P-frame FLQP 119), Initial_QP (I) may be an initial QP value for an I-frame (as discussed above), Function1 may be a conditional function, Distortion(P) may be a P-frame spatial and/or temporal complexity based on an intra prediction distortion and/or inter prediction distortion, C may be an empirically determined constant, and Threshold2 may be an empirically determined constant or threshold value.

As shown in Equation (7), a P-frame frame level quantization parameter for a scene change frame may be proportional to the complexity of the P-frame raised to a value, C. C may be any suitable value or constant such as, for example, 1, or any non-integer value. As discussed, C may be empirically determined and may be based on the method used to determine the complexity (e.g., SAD or summation distortion or the like). In some examples, C may be based on the content of video 102 such that C may be adaptive or variable based on video 102. The value of C in Equation (7) may be the same as the value of C in Equation (4) or they may be different.

Function1 may be any suitable conditional function for providing a factor to Initial_QP (I) to determine $QP_{P\_frame}$; for example, Function1 may provide a value based on range, a set of ranges, a threshold, or a set of thresholds or the like. For example, if Distortion(P)$^C$/Threshold2 is below a threshold, a certain value may be provided and, if Distortion(P)$^C$/Threshold2 is above a threshold another value may be provided, or the like. Function1 may implement any number of thresholds or ranges or the like.

As discussed, the P-frame level quantization parameter may be greater than the initial QP for P-frames when the temporal complexity of the P-frame indicates high temporal complexity such that relatively large QPs may be used for frames with high temporal complexity (e.g., when a user may not notice a decrease in quality and compression may be increased) and relatively small QPs may be used for frames with low temporal complexity (e.g., when higher quality may be beneficial to a user). In some examples, high temporal complexity may determined based on an inter prediction distortion and empirically determine constants. As is discussed further herein, similarly for other inter frames (e.g., P-frames that are not scene change frames, B-frames, and B-reference frames), the frame level quantization parameter may be greater than the initial or reference QP for inter frames when the temporal complexity of the inter frame indicates high temporal complexity As shown in FIG. 1, the P-frame frame level quantization parameter for a scene change may be provided as P-frame FLQPs 119 or a portion thereof. Furthermore, the P-frame frame level quantization parameter for a scene change and/or other determined data may be transmitted to historical complexity and QP module 106. For example, such data or portions thereof may be transmitted to B-frame QP estimation module 109 via coupling 124. For example, based on the scene change P-frame, the B-frame reference quantization parameter (QP) discussed above may be adjusted or re-determined by B-frame QP estimation module 109. In an example, the B-frame reference QP may be based on a constant quality factor for the video sequence increased by an inter B-frame offset (e.g., as shown in Equation (3)) and modified based on the P-frame frame level QP associated with it. For example, the B-frame reference QP may be determined as shown in Equation (8):

$$QP_{B\_reference}=\text{Initial\_QP}(B)+(QP_{P\_scene\_change\_frame}-\text{Initial\_QP}(I))\times w2 \qquad (8)$$

where $QP_{B\_reference}$ may be the B-frame reference QP, Initial_QP (B) may be an initial QP value for a B-frame (as discussed above), $QP_{P\_scene\_change\_frame}$ may be the P-frame frame level quantization parameter for a scene change frame (e.g., one of P-frame FLQP 119) of the P-frame indicating a scene change and associated with the B-frame(s), Initial_QP (I) may be an initial QP value for an I-frame (as discussed above), and w2 may be a weighting factor. For example, weighting factor w1 may be any suitable valuable for weighting the contribution of ($QP_{INTRA}$-Initial_QP (I)) to $QP_{P\_reference}$. In some examples, weighting factor w2 may be in the range of about 0.5 to 1, with a value of 0.9 being particularly advantageous. In some examples, weighting factors w1 and w2 may be the same and, in other examples, they may be different. In some examples, the weighting factor w2 of Equation (8) may be the same as the weighting factor w2 of Equation (6) and, in other examples, they may be different.

Returning to scene change detection and P-frame QP estimation module 108, for a subject P-frame or for each P-frame of video 102, if the target frame is not determined to be a scene change frame, a temporal ratio may be determined as shown in Equation (9):

$$T\_ratio=\text{Current\_Distortion}(P)^C/\text{Past\_Average}(P)^C \qquad (9)$$

where T_ratio may be the temporal ratio, Current_Distortion (P) may be a P-frame spatial and/or temporal complexity based on an intra prediction distortion and/or inter prediction distortion for a current P-frame, C may be an empirically determined constant, and Past_Average(P) may be a spatial and/or temporal complexity based on an intra prediction distortion and/or inter prediction distortion for previous P-frames. C may be any suitable constant such as, for example, 1, or any non-integer value. As discussed, C may be empirically determined and may be based on the method used to determine the complexities (e.g., SAD or summation distortion or the like). In some examples, C may be based on the content of video 102 such that C may be adaptive or variable based on video 102. In some examples the value of C in Equation (9) may be the same as one or more of those discussed herein and, in other examples, the value of C in Equation (9) may be different.

In general, a non-scene change P-frame may be coded based on a reference frame (e.g., a reference I-frame and/or P-frame). At scene change detection and P-frame QP estimation module 108 or elsewhere within system 100, it may be determined whether the reference frame for a non-scene change P-frame is an intra frame (e.g., an I-frame) or a scene change frame (e.g., a scene change P-frame). If the reference frame is an intra frame or a scene change frame, the P-frame FLQP may be determined based on the P-frame reference QP as modified based on the temporal ratio as described above and modification parameters. In some examples, the frame level QP (e.g., P-frame FLQP 119) may be determined as shown in Equation (10):

$$QP_{P\_frame}=QP_{P\_reference}+\text{CLIP}(\text{Function2}(T\_ratio),-3,3) \qquad (10)$$

where $QP_{P\_frame}$ may be a P-frame frame level quantization parameter (e.g., P-frame FLQP 119) for a non-scene change P-frame coded using an intra or scene change reference frame, $QP_{P\_reference}$ may be a P-frame reference QP parameter (as discussed with respect to Equations (5)), CLIP may be a clipping function, Function2 may a conditional function, T_ratio may be a temporal ratio as discussed with respect to Equation (9) above, and −3 and 3 may be modification parameters for clipping function CLIP. As shown, in some examples, the modification parameters may be −3 and 3; however the modification parameters may include any suitable values such as −2 and 2 or −1 and 1 or the like.

Function2 may be any suitable conditional function based on T_ratio, for example, Function1 may provide a value based on range, a set of ranges, a threshold, or a set of thresholds or the like. For example, if based on T_ratio is below a threshold, a certain value may be provided and, if based on T_ratio is above a threshold another value may be provided, or the like. Function1 may implement any number of thresholds or ranges or the like. CLIP may be any suitable clipping function. For example, the function CLIP(X, MIN, MAX) is equal to MAX if X>MAX, CLIP(X, MIN, MAX) is equal to MIN if X<MIN, and, otherwise, CLIP(X, MIN, MAX) is equal to X.

Furthermore, scene change detection and P-frame QP estimation module 108 may update or re-determine a reference QP for P-frames based on the determined P-frame FLQP for the P-frame with an intra or scene change reference frame. In an embodiment, the reference QP may be set as equal to the P-frame FLQP for the P-frame with an intra or scene change reference frame. In some examples, the reference QP may be based on the Equation (11) as follows:

$$QP_{P\_reference}=QP_{P\_frame} \quad (11)$$

where $QP_{P\_reference}$ may be the QP reference for P-frames and $QP_{P\_frame}$ may be the frame level for the P-frame with an intra or scene change reference frame as described above.

If the reference frame for the non-scene change P-frame is not an intra frame nor a scene change frame, the P-frame FLQP may be determined based on the P-frame reference QP as modified based on the temporal ratio as described above and modification parameters. In some examples, the frame level QP (e.g., P-frame FLQP 119) may be determined as shown in Equation (12):

$$QP_{P\_frame}=QP_{P\_reference}+\text{CLIP}(\text{Function2}(T\_\text{ratio}),-1,1) \quad (12)$$

where $QP_{P\_frame}$ may be a P-frame frame level quantization parameter (e.g., P-frame FLQP 119) for a non-scene change P-frame coded using neither an intra frame nor a scene change reference frame, $QP_{P\_reference}$ may be a P-frame reference QP parameter (as discussed with respect to Equations (5) and Equation (11)), CLIP may be a clipping function as discussed with respect to Equation (10), Function2 may a conditional function, T_ratio may be a temporal ratio as discussed with respect to Equation (9) above, and −1 and 1 may be modification parameters for clipping function CLIP. As shown, in some examples, the modification parameters may be −1 and 1; however the modification parameters may include any suitable values such as −2 and 2 or the like.

Furthermore, B-frame QP estimation module 109 may receive data (e.g., via scene change detection and P-frame QP estimation module 108, coupling 122, historical complexity and QP module 106, and coupling 124 or the like) and B-frame QP estimation module 109 may update or re-determine a reference QP for B-frames based on the determined P-frame FLQP values described above. In some examples, the reference QP for B-frames may be determined based on Equation (13) as follows:

$$QP_{B\_reference}=QP_{P\_frame}+(\text{Initial\_QP}(P)-\text{Initial\_QP}(B)) \quad (13)$$

where $QP_{B\_reference}$ may be the QP reference for B-frames, $QP_{P\_frame}$ may be the frame level QP for the P-frame as described above with respect to Equation (12), Initial_QP (P) may be an initial QP value for a P-frame (as discussed above), and Initial_QP (B) may be an initial QP value for a B-frame (as discussed above).

Returning to scene change detection and P-frame QP estimation module 108, the determination of each type of frame level quantization parameter (e.g., for scene change P-frames, for non-scene change P-frames referencing intra or scene change P-frames for coding, and for non-scene change P-frames referencing non-intra and non-scene change P-frames for coding) have been described. Such P-frame frame level quantization parameters (FLQPs) 119 may be provided to block based QP adjustment module 110 for further processing as is discussed below.

Continuing with FIG. 1, B-frame QP estimation module 109, as shown, may receive spatial and/or temporal complexity values 117, initial quantization parameter value(s) 116, and other data from historical complexity and QP module 106 via coupling 124 and may generate B-frame frame level quantization parameters (FLQPs) 120. For example, B-frame QP estimation module 109 may generate, update, and maintain a reference B-frame QP value (e.g., $QP_{B\_reference}$) as discussed above based on previously determined frame level quantization parameters for I-frames and P-frames.

In some examples, B-frame QP estimation module 107 may generate B-frame FLQPs 120 based on the determined, re-determined, and/or maintained reference B-frame QP value, for example. In some examples, a B-frame FLQP 120 for a B-frame may be equal to the reference B-frame QP value, as shown in Equation (14):

$$QP_{B\_frame}=QP_{B\_reference} \quad (14)$$

where $QP_{B\_frame}$ may be the B-frame frame level quantization parameter (e.g., one of B-frame FLQPs 119) and $QP_{B\_reference}$ may be the reference B-frame QP value as discussed above. In an embodiment, the B-frame FLQP 120 for a frame may be equal to the reference B-frame QP value in implementations where a hierarchical coding structure is not used or enabled.

In implementations where a hierarchical coding structure is used or enabled, B-frame frame level quantization parameters (FLQPs) 119 for B-frames may be determined as discussed with respect to Equation (14) and, for B-reference frames, B-frame frame level quantization parameters (FLQPs) 119 may be based on an average of the reference B-frame QP value and a reference P-frame QP value (e.g., a reference quantization parameter of a P-frame associated with the B-reference frame). For example, for B-reference frames, a B-frame frame level quantization parameters (FLQPs) 119 may be determined as shown in Equation (15):

$$QP_{B\_reference\_frame}=(QP_{B\_reference}+QP_{P\_reference})/2 \quad (15)$$

where $QP_{B\_reference}$ frame may be the B-reference frame frame level quantization parameter (e.g., one of B-frame FLQPs 119), $QP_{B\_reference}$ may be the reference B-frame QP value as discussed above, and $QP_{P\_reference}$ may be the reference P-frame QP value as discussed above.

As shown in FIG. 1, the B-Frame FLQPs 120 may be transmitted to block based QP adjustment module 110.

As described, block based QP adjustment module 110 may receive frame level quantization parameters (e.g., quantization parameters for video frames) for I-frames, P-frames, and B-frames (e.g., I-Frame FLQPs 118, P-Frame FLQPs 119, and B-Frame FLQPs 120) via modules 107, 108, and 109, respectively. Block based QP adjustment module 110 may generate, for individual blocks of the video frames (e.g., for all frame types), block level quantization parameters (BLQPs) 125. In some examples, block based QP adjustment module 110 may receive information describing the blocks, motion vectors associated with the blocks, modes, or the like from other modules of system 100. As shown, block based QP adjustment module 110 may transmit block level quantization parameters 125 to quantization module 112 and/or mode selection 113 as is discussed further below.

In some examples, BLQPs 125 may be generated based on the frame level quantization parameter for the video frame of which the blocks are portions. For example, for each block of the video frame, a block level quantization parameter may be generated based on the frame level quantization parameter of the video frame, a complexity of the block, and a complexity of the video frame. The block of the video frame may be any suitable block such as, for example, a macroblock (e.g., a MB in AVC), a coding unit (e.g., a CU in HEVC), a partition, a slice, or the like. As is discussed, the frame level QP may be adjusted to a smaller value for blocks with high HVS sensitivity and to larger values with low HVS sensitivity.

In an example, a ratio of the complexity of the block to an average complexity of the video frame may be determined. For example, the complexity of the block may be based on a block prediction distortion, a block variance, or a combination thereof. The complexity of the video frame may be based on an analogous determination (e.g., an average of block prediction distortions, an average of block variances, or combinations thereof). Such a ratio may be described as a distortion ratio, for example. In some examples, a lower distortion ratio (e.g. less than 1) may represent a high HVS sensitivity block or region of a video frame. In some examples, the distortion ratio may be compared to a threshold or threshold(s) and, based on the comparison, the frame level quantization parameter may be modified to generate the block level quantization parameter. In an embodiment, the block level quantization parameter may be greater than the frame level quantization parameter (e.g., the frame level quantization parameter may be increased to determine the block level quantization parameter) when a ratio of the complexity of the individual block to the complexity of the video frame is greater than one For intra frames (and associated I-Frame FLQPs 118), a distortion ratio for each block may be determined as discussed. In some examples, for each block, the block level quantization parameter (BLQP) may be determined based on a comparison of the distortion ratio to a threshold and based on the FLQP of the I-frame. For example, if the distortion ratio is greater than a threshold, the block level quantization parameter (BLQP) may determined to be equal to the FLQP. If the distortion ratio is less than the threshold, an offset may be determined based on the distortion ratio and the offset may be applied to the FLQP to determine the BLQP (e.g., the FLQP may be reduced by the offset to determine the BLQP). In some examples, the block level QP may be determined for a block of an I-frame having a distortion greater than a threshold as shown in Equation (16):

$$QP_{intra\_block} = QP_{INTRA} + \text{OffsetI}(\text{Distortion\_Ratio}) \quad (16)$$

where $QP_{Intra\_block}$ may be the block level quantization parameter for an intra block having a distortion ratio greater than a threshold, $QP_{INTRA}$ may be an I-frame frame level quantization parameter, OffsetI may be a function that determines an offset, and Distortion_Ratio may be the distortion ratio as discussed. In some examples, the offset may be in the range of about −1 to −6 such that a block in a low complexity region may have a block level quantization parameter up to 6 units smaller than the frame level QP. OffsetI may be any suitable function such as a linear function, a selection function or the like. As discussed, in some examples, OffsetI may provide an offset in the range of −1 to −6; however any suitable offset or range of offsets may be used such as a range from −1 to −4 or −2 to −3 or the like.

For P-frames (and associated P-Frame FLQPs 118) that are scene change frames (as discussed above), a distortion ratio for each block of the scene change P-frame may be determined as discussed above and the BLQP may be determined based on a comparison of the distortion ratio to a threshold and based on the scene change P-frame FLQP. For example, if the distortion ratio is greater than the threshold, the block level quantization parameter (BLQP) may determined to be equal to the FLQP. If the distortion ratio is less than the threshold, an offset may be determined based on the distortion ratio and the offset may be applied to the FLQP to determine the BLQP (e.g., the FLQP may be reduced by the offset to determine the BLQP) as shown in Equation (17):

$$QP_{P\_scene\_change\_block} = QP_{P\_scene\_change\_frame} + \text{OffsetP}(\text{Distortion\_Ratio}) \quad (17)$$

where $QP_{P\_scene\_change\_block}$ may be the block level quantization parameter for a scene change P-frame block having a distortion ratio greater than a threshold, $QP_{P\_scene\_change\_frame}$ may be a scene change P-frame frame level quantization parameter, OffsetP may be a function that determines an offset, and Distortion_Ratio may be the distortion ratio as discussed. In some examples, the offset may be in the range of about −1 to −6 such that a block in a low complexity region may have a block level quantization parameter up to 6 units smaller than the frame level QP. As discussed with respect to function OffsetI, OffsetP may be any suitable function such as a linear function, a selection function or the like and OffsetP may provide any suitable offset or range of offsets such as an offset in the range of −1 to −6, −1 to −4, −2 to −3 or the like.

For P-frames (e.g. P-Frame FLQPs 118) that are not scene change frames and for B-frames (e.g., for inter frames), a distortion ratio for each block may be determined as discussed above and the BLQP may be determined based on a comparison of the distortion ratio to one or more thresholds and based on the non-scene change or B-frame FLQP. In some examples, the BLQP may also be based on a motion vector of the block. For example, if the distortion ratio for a block is greater than the first threshold, a positive offset may applied to the FLQP to determine the BLQP. The positive offset may be any suitable offset or range of offsets based on the distortion ratio such as, for example, an offset in the range of 1 to 3, 1 to 4, or the like. In an embodiment, the positive offset is in the range of 1 to 3 such that a block (e.g., a block in an HVS low sensitivity area) may use a quantization parameter up to 3 larger than the frame level quantization parameter. Furthermore, if the distortion ratio for a block is less than the second threshold, a negative offset may applied to the FLQP to determine the BLQP. The negative offset may be any suitable offset or range of offsets based on the distortion ratio such as, for example, an offset in the range of −1 to −4, −1 to −2, or the like. In an embodiment, the negative offset is in the range of −1 to −4 such that a block (e.g., a block in an HVS sensitive area) may use a quantization parameter up to 4 less than the frame level quantization parameter.

As discussed, in some examples, a first threshold may be used for a positive offset determination and a second threshold may be used for a negative offset determination. In some examples, the first threshold may be greater than the second threshold. In an embodiment, the first threshold may be greater than the second threshold and, if the distortion ratio for a block is between the first and second thresholds, the block level QP for the block is set to the frame level QP. In some examples, the first thresholds may be the same or different for different frame types and the second thresholds may be the same or different for different frame types.

Furthermore, in some examples, a motion vector associated with a block may be used to determine the offset (positive or negative or no change) or to modify the distortion ratio based offset. For example, for blocks with a large motion vector, a positive offset may be applied and/or the offset determined based on the distortion ratio may be increased. Similarly, for blocks with a small or zero motion vector, a negative offset may be applied and/or the offset determined based on the distortion ratio may be decreased.

As shown in FIG. 1, block based QP adjustment module 110 may transmit BLQPs 125 to quantization module 112 and/or mode selection module 113. Quantization module 112 may receive BLQPs 125 and transform coefficients 111 and may quantize transform coefficients 111 based on BLQPs 125. Transform coefficients 111 may be any suitable transform coefficients such as, for example, transform coefficients based on a discrete cosine transform of luma data, chroma data, differential data (e.g., for differences between predicted blocks and actual blocks), or the like. For example, quantization module 112 may quantize a block of transform coefficients using the block based QP for the block as discussed herein. Blocks that are in HVS sensitive regions or sequences may be quantized using smaller QPs (for higher quality) and blocks that are in low HVS sensitive regions or sequences may be quantized using larger QPs (for bitrate savings). Mode selection module 113 may receive BLQPs 125 and may be used for mode selections and/or mode decisions.

As shown, BLQPs 125, quantized transform coefficients and/or mode selection data may be transmitted to entropy encoder 114. Entropy encoder 114 may entropy encode BLQPs 125, the quantized transform coefficients, mode(s) data, and/or other data (e.g., motion vectors and the like) into bitstream 115. In some examples, the quantized transform coefficients, mode(s) data, and/or other data may be provided to a scanning module prior to encoding. Furthermore, although discussed herein with respect to entropy encoding, any suitable encoding technique(s) may be used. Bitstream 115 may be transmitted to another device for decoding or saved to a memory device or the like. In some examples, bitstream 115 may be a standards compliant bitstream such as, for example, a bitstream compliant with AVC or HEVC or the like.

The techniques discussed with respect to FIG. 1 and elsewhere herein may offer similar or better subject video quality with the advantage of reduced bitrates.

Figure 2:
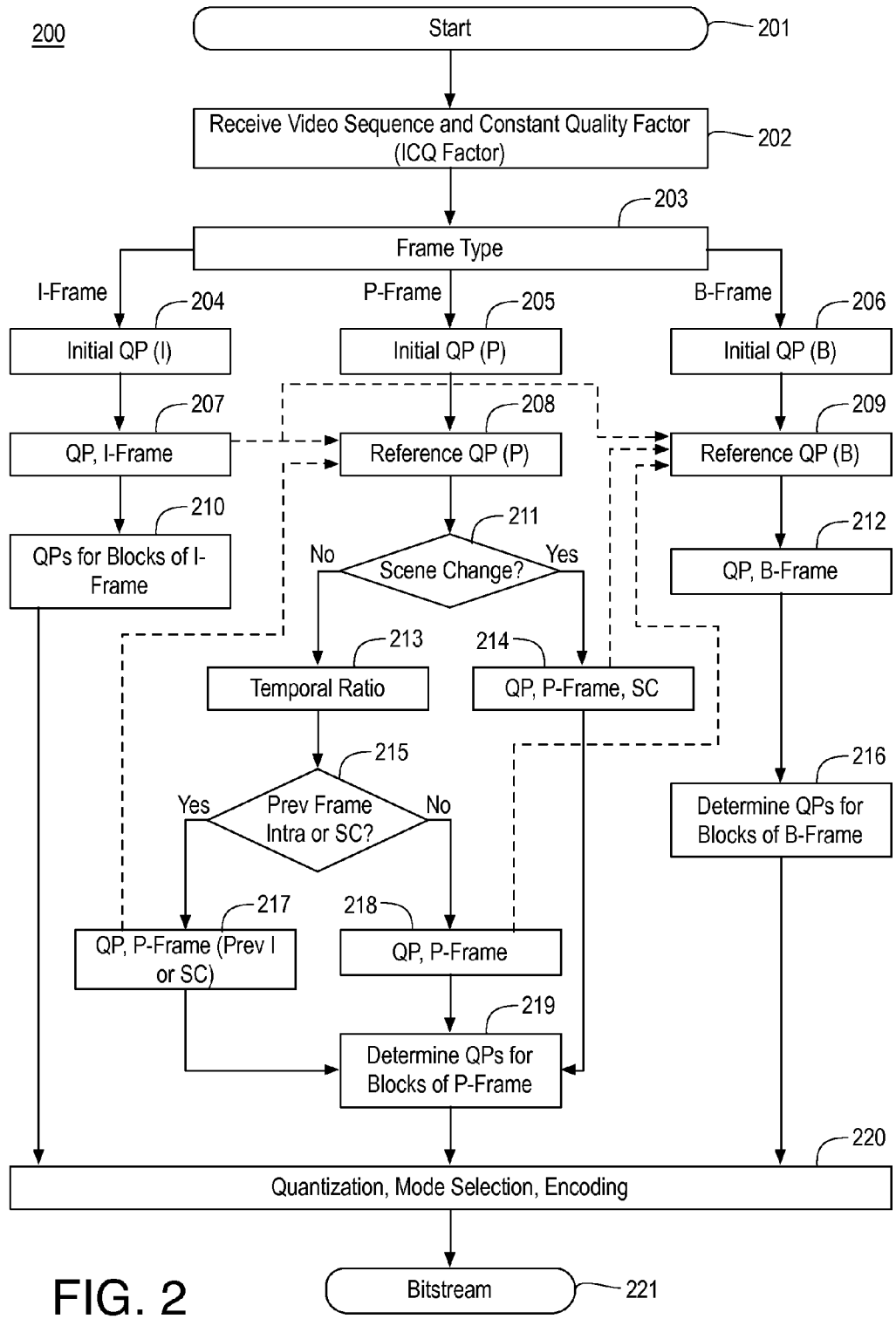
FIG. 2 is a flow diagram illustrating an example process for providing video coding with constant visual quality.

FIG. 2 is a flow diagram illustrating an example process 200 for providing video coding with constant visual quality, arranged in accordance with at least some implementations of the present disclosure. Process 200 may include one or more operations 201-221 as illustrated in FIG. 2. Process 200 may form at least part of a video coding process. By way of non-limiting example, process 200 may form at least part of a video coding process for video as undertaken by system 100 as discussed herein.

Process 200 may begin at start operation 201, "Start", where a constant visual quality coding may be enabled or selected (e.g., a constant visual quality mode may be set or selected). Furthermore, an ICQ factor such as ICQ factor 103 may be determined by a user or system 100 or the like as discussed herein and a video sequence or the like such as video 102 may be selected for coding.

Process 200 may continue at operation 202, "Receive Video Sequence and Constant Quality Factor (ICQ Factor)", where a video sequence and an ICQ factor may be received. For example, video 102 and ICQ factor 103 may be received via quantization parameter module 101.

Process 200 may continue at operation 203, "Frame Type", where a frame type of a frame of the video sequence may be determined. For example, any frame type (e.g., I-, P-, B-, B-reference, or the like) may be determined Depending on the frame type, processing may continue at operation 204, 205, or 206. The operations of process 200 may be described in a linear or serial manner for the sake of clarity of presentation; however, in practice, the operations of process 200 may be performed in any order and/or in parallel. For example, multiple frames may be processed at once using process 200.

If the frame type is determined to be I-frame, process 200 may continue at operation 204, "Initial QP (I)", where an initial quantization parameter may be determined for the I-frame. For example, Initial QP (I) may be determined by initial QP estimation module 105 based on Equation (1) as discussed herein.

Process 200 may continue at operation 207, "QP I-Frame", where a frame level QP may be determined for the I-frame. For example, intra frame QP estimation module 107 may determine a frame level QP for the I-frame based on the initial quantization parameter for the I-frame and a spatial and/or temporal complexity of the I-frame (e.g., as received from spatial/temporal complexity module 104). In an embodiment, intra frame QP estimation module 107 may determine a frame level QP for the I-frame based on Equation (4) as discussed herein.

Process 200 may continue at operation 210, "QPs for Blocks of I-Frame", where block level quantization parameters may be determined for blocks of the I-frame. For example, block based QP adjustment module 110 may determine block level QPs for the I-frame based on a distortion ratio for a block and a comparison with a threshold. For example, if the block's distortion ratio is greater than the threshold, the block level QP for the block may be the frame level QP and, if the block's distortion ratio is less than the threshold, the block level QP for the block may be determined based on Equation (16) as discussed herein.

Process 200 may continue at operation 220, "Quantization, Mode Selection, Encoding", where mode selection(s) may be based on the I-frame BLQPs, transform coefficients may be quantized based on the I-frame BLQPs, and the quantized transform coefficients, I-frame BLQPs, mode(s) data, and/or additional data may be entropy encoded into a bitstream. For example, quantization module 112 may quantize transform coefficients based on I-frame BLQPs 125 (which may include other frame BLQPs as discussed), mode selection module 113 may make mode selection(s) based on I-frame BLQPs 125, and entropy encoder 114 may encode quantized transform coefficients, I-frame BLQPs, mode(s) data, and/or additional data into bitstream 115.

Returning to operation 203, if the frame type is determined to be P-frame, process 200 may continue at operation 205, "Initial QP (P)", where an initial quantization parameter may be determined for the P-frame. For example, Initial QP (P) may be determined by initial QP estimation module 105 based on Equation (2) as discussed herein.

Process 200 may continue at operation 208, "Reference QP (P)", where a reference QP for the P-frame (and/or other P-frames) may be determined and/or maintained. For example, a reference QP for P-frames may be determined based on the frame level QP of the I-frame (e.g., for the I-frame reference of the current P-frame(s)) as determined at operation 207 and as shown via the dashed line from operation 207 to operation 208. In an example, scene change detection and P-frame QP estimation module 108 may determine the reference QP using the I-frame FLQP based on Equation (5) as discussed herein. In another example, the reference QP for P-frames may be determined or re-determined or modified based a frame level QP of a previous P-frame having an intra or scene change reference frame and as shown via the dashed line from operation 217 to operation 208. In an example, scene change detection and P-frame QP estimation module 108 may determine the reference QP using the QP of a previous P-frame having an intra or scene change reference frame based on Equation (11) as discussed herein.

Process 200 may continue at decision operation 211, "Scene Change?", where it may be determined whether the P-frame is a scene change P-frame. For example, scene change detection and P-frame QP estimation module 108 may determine whether the P-frame is a scene change P-frame based on the temporal complexity of the P-frame. In an embodiment, a ratio may be determined based on the temporal complexity of the target P-frame and a past average temporal complexity based on past frames such that, if the ratio is greater than the threshold, the target P-frame is determined to be a scene change frame.

If the P-frame is determined to be a scene change P-frame, process 200 may continue at operation 214, "QP, P-Frame, SC", where a frame level QP may be determined for the scene change P-frame. For example, scene change detection and P-frame QP estimation module 108 may determine a frame level QP for the scene change P-frame based on the initial quantization parameter for the I-frame and a spatial and/or temporal complexity of the scene change P-frame (e.g., as received from spatial/temporal complexity module 104). In an embodiment, scene change detection and P-frame QP estimation module 108 may determine a frame level QP for the scene change P-frame based on Equation (7) as discussed herein.

Process 200 may continue at operation 219, "Determine QPs for Blocks of P-Frame", where block level quantization parameters may be determined for blocks of the scene change P-frame. For example, block based QP adjustment module 110 may determine block level QPs for the scene change P-frame based on a distortion ratio (e.g., a ratio of the complexity of the block to the complexity of the frame) for a block and a comparison with a threshold. For example, if the block's distortion ratio is greater than the threshold, the block level QP for the block may be the frame level QP and, if the block's distortion ratio is less than the threshold, the block level QP for the block may be determined based on Equation (17) as discussed herein.

Process 200 may continue at operation 220, "Quantization, Mode Selection, Encoding", where mode selection(s) may be based on the scene change P-frame BLQPs, transform coefficients may be quantized based on the scene change P-frame BLQPs, and the quantized transform coefficients, scene change P-frame BLQPs, mode(s) data, and/or additional data may be entropy encoded into a bitstream. For example, quantization module 112 may quantize transform coefficients based on scene change P-frame BLQPs 125 (which may include other frame BLQPs as discussed), mode selection module 113 may make mode selection(s) based on scene change P-frame BLQPs, and entropy encoder 114 may encode quantized transform coefficients, I-frame BLQPs, mode(s) data, and/or additional data into bitstream 115.

Returning to operation 211, if the P-frame is determined to not be a scene change P-frame, process 200 may continue at operation 213, "Temporal Ratio", where a temporal ratio may be determined for the P-frame (e.g., the non-scene change P-frame). For example, the temporal ratio may be determined by scene change detection and P-frame QP estimation module 108 based on Equation (9) as discussed herein.

Process 200 may continue at decision operation 215, "Previous (Prev) Frame Intra or Scene Change (SC)?", where it may be determined whether a coding reference frame for the current P-frame (e.g., the non-scene change P-frame) is an intra frame (e.g., an I-frame) or a scene change P-frame. For example, scene change detection and P-frame QP estimation module 108 or another module of system 100 may determine whether the reference frame for the non-scene change P-frame is an intra frame or a scene change frame P-frame.

If the current P-frame is based on an intra frame or a scene change P-frame, process 200 may continue at operation 217, "QP, P-Frame (Prev I or SC)", where a frame level quantization parameter may be determined for the non-scene change P-frame with an intra or scene change reference frame. For example, scene change detection and P-frame QP estimation module 108 may determine the frame level QP for the P-frame based on Equation (10) as discussed herein.

Process 200 may continue at operation 219, "Determine QPs for Blocks of P-Frame", where block level quantization parameters may be determined for blocks of the non-scene change P-frame having an intra or scene change reference frame. For example, block based QP adjustment module 110 may determine block level QPs for the P-frame based on a distortion ratio for each block (e.g., a ratio of the complexity of the block to the complexity of the frame) and a comparison of the distortion ratio to one or more thresholds. For example, if the distortion ratio for a block is greater than a first threshold, a positive offset may applied to the frame level QP to determine the block level QP and, if the distortion ratio for a block is less than the second threshold, a negative offset may applied to the frame level QP to determine the block level QP as discussed herein.

Process 200 may continue at operation 220, "Quantization, Mode Selection, Encoding", where mode selection(s) may be based on the non-scene change P-frame with an intra or scene change P-frame reference BLQPs, transform coefficients may be quantized based on the BLQPs, and the quantized transform coefficients, scene change P-frame BLQPs, mode(s) data, and/or additional data may be entropy encoded into a bitstream, as discussed with reference to I-frame BLQPs and/or scene change P-frame BLQPs.

Returning to operation 215, if the current P-frame is not based on an intra frame nor a scene change P-frame, process 200 may continue at operation 218, "QP, P-Frame", where a frame level quantization parameter may be determined for the non-scene change P-frame not having an intra nor a scene change reference frame. For example, scene change detection and P-frame QP estimation module 108 may determine the frame level QP for the P-frame based on Equation (12) as discussed herein.

Process 200 may continue at operation 219, "Determine QPs for Blocks of P-Frame", where block level quantization parameters may be determined for blocks of the non-scene change P-frame not having an intra nor a scene change reference frame. For example, block based QP adjustment module 110 may determine block level QPs for the P-frame based on a distortion ratio for each block (e.g., a ratio of the complexity of the block to the complexity of the frame) and a comparison of the distortion ratio to one or more thresholds. For example, if the distortion ratio for a block is greater than a first threshold, a positive offset may applied to the frame level QP to determine the block level QP and, if the distortion ratio for a block is less than the second threshold, a negative offset may applied to the frame level QP to determine the block level QP as discussed herein.

Process 200 may continue at operation 220, "Quantization, Mode Selection, Encoding", where mode selection(s) may be based on the non-scene change P-frame not having an intra or scene change P-frame reference frame BLQPs, transform coefficients may be quantized based on the BLQPs, and the quantized transform coefficients, scene change P-frame BLQPs, mode(s) data, and/or additional data may be entropy encoded into a bitstream, as discussed herein.

Returning to operation 203, if the frame type is determined to be B-frame, process 200 may continue at operation 206, "Initial QP (B)", where an initial quantization parameter may be determined for the B-frame. For example, Initial QP (B) may be determined by initial QP estimation module 105 based on Equation (3) as discussed herein.

Process 200 may continue at operation 209, "Reference QP (B)", where a reference QP for the B-frame (and/or other B-frames) may be determined and/or maintained. For example, a reference QP for B-frames may be determined based on the frame level QP of the I-frame as determined at operation 207 and as shown via the dashed line from operation 207 to operation 209, based on the frame level QP. In an example, B-frame QP estimation module 109 may determine the reference QP using the I-frame FLQP based on Equation (6) as discussed herein. In another example, the reference QP for B-frames may be determined or re-determined or modified based a frame level QP of a previous scene change P-frame and as shown via the dashed line from operation 215 to operation 209. In an example, B-frame QP estimation module 109 may determine the reference QP using the scene change P-frame FLQP based on Equation (8) as discussed herein. In yet another example, the reference QP for B-frames may be determined or re-determined or modified based a frame level QP of a previous non-scene change P-frame that does not have a reference frame that is an intra frame or scene change frame and as shown via the dashed line from operation 218 to operation 209. In an example, B-frame QP estimation module 109 may determine the reference QP using the P-frame FLQP based on Equation (13) as discussed herein.

Process 200 may continue at operation 212, "QP, B-Frame", where a frame level QP may be determined for the B-frame. For example, B-frame QP estimation module 109 may determine a frame level QP for the B-frame based on the initial quantization parameter for the B-frame as modified to generate the reference quantization parameter for the B-frame. In an embodiment, B-frame QP estimation module 109 may determine a frame level QP for the B-frame based on Equation (14) as discussed herein (e.g., the frame level QP may be the maintained B-frame reference QP). In another embodiment, B-frame QP estimation module 109 may determine a frame level QP for the B-frame (e.g., for a B-reference frame) based on Equation (15) as discussed herein.

Process 200 may continue at operation 216, "Determine QPs for Blocks of B-Frame", where block level quantization parameters may be determined for blocks of the B-frame. For example, block based QP adjustment module 110 may determine block level QPs for the B-frame based on a distortion ratio for each block (e.g., a ratio of the complexity of the block to the complexity of the frame) and a comparison of the distortion ratio to one or more thresholds. For example, if the distortion ratio for a block is greater than a first threshold, a positive offset may applied to the frame level QP to determine the block level QP and, if the distortion ratio for a block is less than the second threshold, a negative offset may applied to the frame level QP to determine the block level QP as discussed herein.

Process 200 may continue at operation 220, "Quantization, Mode Selection, Encoding", where mode selection(s) may be based on the B-frame reference BLQPs, transform coefficients may be quantized based on the BLQPs, and the quantized transform coefficients, scene change P-frame BLQPs, mode(s) data, and/or additional data may be entropy encoded into a bitstream, as discussed herein.

Process 200 may end at operation 221, "Bitstream", where a bitstream generated based on the above techniques may be generated. The generated bitstream may be stored via a memory device and/or transmitted to a decoder for decompression, generation of video frames, and presentment of video frames to a user.

FIG. 3 illustrates an example bitstream 300 arranged in accordance with at least some implementations of the present disclosure. In some examples, bitstream 300 may correspond to bitstream 115 as shown in FIG. 1. Although not shown in FIG. 3, in some examples, bitstream 300 may include a header portion or portions and a data portion or portions. Bitstream 300 may include any suitable data associated with encoded video data. As shown in FIG. 3, bitstream 300 may include encoded quantized transform coefficients 301, encoded modes data 302, encoded I-frame block level quantization parameters 303, encoded P-frame block level quantization parameters 304, encoded B-frame block level quantization parameters 305, and/or encoded motion vector data 306. As discussed, bitstream 300 may be generated via entropy encoder 114 of system 100.

For example, bitstream 300 may include encoded quantized transform coefficients 301 that include transform coefficients quantized based on an associated block level quantization parameter as discussed herein (e.g., by quantization module 112). The quantized transform coefficients may encoded (e.g., entropy encoded via entropy encoder 114) and inserted into bitstream 300. Furthermore, bitstream 300 may include encoded modes data 302 that may include mode(s) selection data from mode selection module 113 encoded (e.g., entropy encoded via entropy encoder 114) and inserted into bitstream 300. Also as shown, bitstream 300 may include encoded I-frame block level quantization parameters 303, encoded P-frame block level quantization parameters 304, encoded B-frame block level quantization parameters 305, which may include block level quantization parameters (e.g., BLQPs). encoded (e.g., entropy encoded via entropy encoder 114) and inserted into bitstream 300.

As discussed, bitstream 300 may be generated via an encoder or encoder system such as, for example, system 100, and bitstream 300 may be stored to a memory (e.g., of system 100), stored to a memory storage device (e.g., a disc, a server for download, or the like). Furthermore, bitstream 300 may be accessed (e.g., via reading a disc, streaming, downloading, or the like) by a decoder that may decode the bitstream and generate video frames or sequences of video frames for presentment to a user.

FIG. 4 is a flow diagram illustrating an example process 400 for providing video coding with constant visual quality, arranged in accordance with at least some implementations of the present disclosure. Process 400 may include one or more operations 401-403 as illustrated in FIG. 4. Process 400 may form at least part of a video encoding process. By way of non-limiting example, process 400 may form at least part of a video encoding process for video as undertaken by system 100 as discussed herein. Further, process 400 will be described herein in reference to system 500 of FIG. 5.

Figure 5:
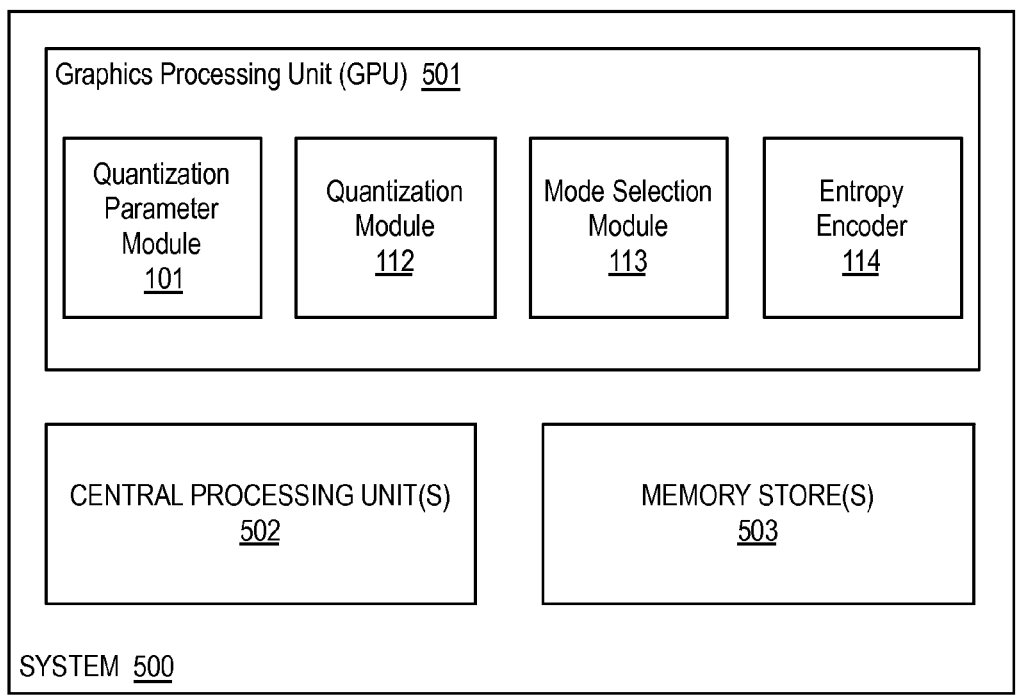
FIG. 5 is an illustrative diagram of an example system for providing video coding with constant visual quality.

FIG. 5 is an illustrative diagram of an example system 500 for providing video coding with constant visual quality, arranged in accordance with at least some implementations of the present disclosure. As shown in FIG. 5, system 500 may include a graphics processing unit (GPU) 501, one or more central processing units 502, and memory stores 503. Also as shown, GPU 501 may include quantization parameter module 101, quantization module 112, mode selection module 113, and/or entropy encoder module 114. In the example of system 500, memory stores 503 may store video content such as video frames and/or a bitstream.

Graphics processing unit 501 may include any number and type of graphics processing units that may provide the operations as discussed herein. Such operations may be implemented via software or hardware or a combination thereof. In an embodiment, the illustrated modules of graphics processing unit 501 may be implemented via circuitry or the like. For example, graphics processing unit 501 may include circuitry dedicated to manipulate video data to generate compressed image data. Central processing units 502 may include any number and type of processing units or modules that may provide control and other high level functions for system 500. Memory stores 503 may be any type of memory such as volatile memory (e.g., Static Random Access Memory (SRAM), Dynamic Random Access Memory (DRAM), etc.) or non-volatile memory (e.g., flash memory, etc.), and so forth. In an embodiment, memory stores 503 may be configured to store video data such as frame and/or block level quantization parameters, quantized transform coefficients, a bitstream, or any other video data discussed herein. In a non-limiting example, memory stores 503 may be implemented by cache memory. In an embodiment, quantization parameter module 101, quantization module 112, mode selection module 113, and/or entropy encoder module 114 may be implemented via an execution unit (EU) of graphics processing unit 501. The EU may include, for example, programmable logic or circuitry such as a logic core or cores that may provide a wide array of programmable logic functions. In an embodiment, quantization parameter module 101, quantization module 112, mode selection module 113, and/or entropy encoder module 114 may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 4, process 400 may begin at operation 401, "Determine a Quantization Parameter for a Video Frame of a Video Sequence", where a first quantization parameter may be determined for a video frame of a video sequence. For example, one or more of initial QP estimation module, scene change detection and P-frame QP estimation module 108, and/or B-frame QP estimation module 109 may generate a quantization parameter for a video frame. In some examples, the first quantization parameter may include an intelligent constant quality factor, an initial QP value, or a reference QP value as discussed herein.

For example, if the video frame is an I-frame or a scene change P-frame, the first quantization parameter may be an initial QP value such as Initial_QP (I) or a constant quality factor such as ICQ Factor as discussed herein. For example, the quantization parameter may be based on a user selected constant quality factor, ICQ factor.

If the video frame is a P-frame that is not a scene change frame, the first quantization parameter may be based on a constant quality factor (e.g., Initial_QP (I)) or a constant quality factor increased by a P-frame offset (e.g., Initial_QP (P), as shown in Equation (2)) and modified based on an intra frame quantization value associated with the P-frame (e.g., as shown in Equation (5), where the intra frame quantization value is $QP_{INTRA}$).

If the video frame is a B-frame, the first quantization parameter may be based on a constant quality factor increased by a B-frame offset (e.g., Initial_QP (B)) and modified based on an intra frame quantization value associated with the B-frame (e.g., as shown in Equation (6), where the intra frame quantization value is $QP_{INTRA}$) or based on a P-frame quantization value associated with the B-frame (e.g., as shown in Equation (8), where the P-frame quantization value is $QP_{P\_scene\_change\_frame}$).

Process 400 may continue at operation 402, "Modify the Quantization Parameter based on a Complexity of the Video Frame to Generate a Second Quantization Parameter for the Video Frame", where the first quantization parameter may be modified based on at least one of a spatial complexity or a temporal complexity associated with the video frame to generate a second quantization parameter for the video frame. For example, the intelligent constant quality factor, initial QP value, or reference QP value may be modified based on a spatial complexity (e.g., intra prediction distortion) or a temporal complexity (e.g., inter prediction distortion) of the video frame to generate the second quantization parameter. In some examples, the second quantization parameter may be greater than the first quantization parameter when the spatial complexity or the temporal complexity associated with the video frame indicates at least one of high spatial complexity or high temporal complexity, respectively.

For example, if the video frame is an I-frame or a scene change P-frame, the second quantization parameter may be based on the first quantization parameter (e.g., a constant quality factor) and may be proportional to the spatial complexity of the intra frame or the scene change P-frame. For example, the second quantization parameter may be determined based on Equation (4) (e.g., for I-frames) or Equation (7) (e.g., for scene change P-frames) as discussed.

If the video frame is a P-frame that is not a scene change frame, the first quantization parameter may be a reference QP value such as $QP_{P\_reference}$ as discussed. The second quantization parameter may be based on the first quantization parameter adjusted based on a temporal ratio of the temporal complexity of the P-frame and a past average temporal complexity of the video sequence. For example, the second quantization parameter may be determined based on Equations (9) and (10) as discussed herein.

If the video frame is a B-frame, a third quantization parameter may be determined based on the second quantization parameter. For example, the B-frame may be a second frame of the video sequence and the second quantization parameter may be a frame level quantization parameter for the frame (e.g., an I-frame or a P-frame). In this context, the third quantization parameter may be a reference B-frame quantization parameter determined based on Equation (6), (8), or (13), and, as shown in Equation (14), the frame level quantization parameter for the B-frame may be equal to the reference B-frame quantization parameter (e.g., the third quantization parameter as discussed). If the video frame is a B-reference frame, the third quantization parameter may be based on an average of the second quantization parameter such that the second quantization parameter comprises a P-frame reference quantization parameter based on Equation (11) and a B-frame reference quantization parameter, as discussed. For example, the frame level quantization parameter for a B-reference frame may be determined as shown in Equation (15).

Process 400 may continue at operation 403, "Generate a Block Level Quantization Parameter for a Block of the Video Frame based on the Second Quantization Parameter, a Complexity of the Block, and a Complexity of the Video Frame", where a block level quantization parameter for an individual block of the video frame may be generated based on the second quantization parameter, a complexity of the individual block, and a complexity of the video frame. For example, block based QP adjustment module 110 may generate a quantization parameter for an individual block of the video frame. Operation 403 may be repeated for each block of the video frame, for example.

For example, if the video frame is an intra frame (e.g., an I-frame) or a scene change P-frame, the block level quantization parameter may be either equal to the second quantization parameter or less than the second quantization parameter based on a comparison of a ratio of the complexity of the individual block to the complexity of the intra frame or the scene change P-frame with a threshold. For example, a distortion ratio may be determined for the individual block. If the distortion ratio is greater than (or greater than or equal to) the threshold, the block level quantization parameter may be equal to the frame level quantization parameter. If the distortion ratio is less than (or less than or equal to) the threshold, the block level quantization parameter for the block may be determined based on Equation (16) (e.g., for I-frames) or Equation (17) (e.g., for scene change P-frames) as discussed herein.

If the video frame is an inter frame (e.g., a P-frame that is not a scene change frame, a B-frame, or a B-reference frame), the block level quantization parameter may be greater than the second quantization parameter based on a comparison of a ratio of the complexity of the individual block to the complexity of the inter frame with a first threshold or less than the second quantization parameter based on a comparison of the ratio of the complexity of the individual block to the complexity of the inter frame with a second threshold. For example, if the distortion ratio (as discussed above) for the block is greater than a first threshold, a positive offset may applied to the frame level QP to determine the block level QP and, if the distortion ratio for a block is less than the second threshold, a negative offset may applied to the frame level QP to determine the block level QP as discussed herein.

As discussed, block level quantization parameters may be used to quantize transform coefficients associated with the individual block and/or to make mode selection decisions associated with the video sequence. The block level quantization parameters, quantized transform coefficients, and/or modes may be encoded into a bitstream as discussed herein. Process 400 may be repeated any number of times either in series or in parallel for any number of video frames, video sequences, or segments of video.

Various components of the systems described herein may be implemented in software, firmware, and/or hardware and/or any combination thereof. For example, various components of system 100 or system 500 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes (e.g., process 200 and process 400) discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of systems 100 or 500, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 6:
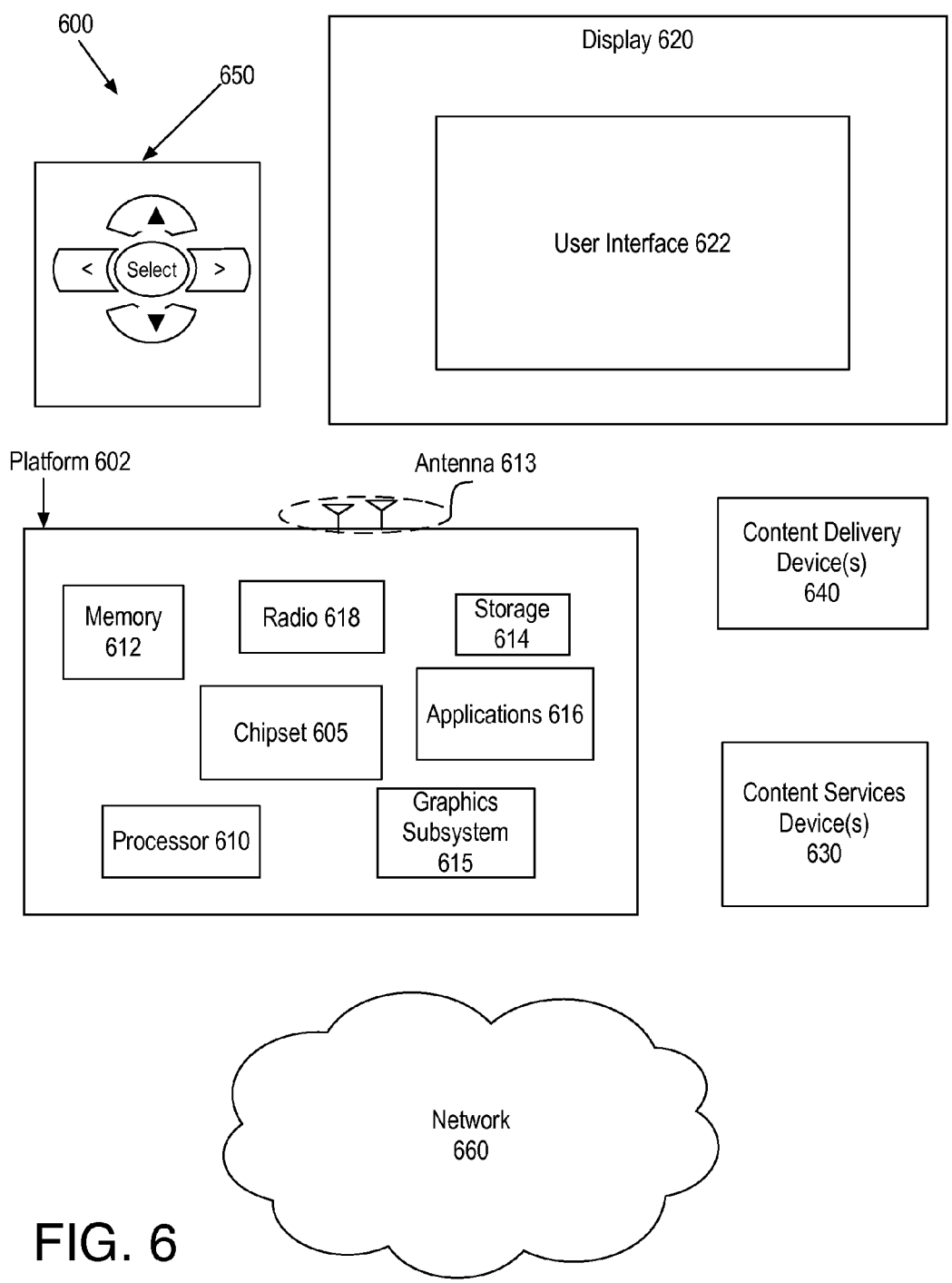
FIG. 6 is an illustrative diagram of an example system.

FIG. 6 is an illustrative diagram of an example system 600, arranged in accordance with at least some implementations of the present disclosure. In various implementations, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 600 includes a platform 602 coupled to a display 620. Platform 602 may receive content from a content device such as content services device(s) 630 or content delivery device(s) 640 or other similar content sources. A navigation controller 650 including one or more navigation features may be used to interact with, for example, platform 602 and/or display 620. Each of these components is described in greater detail below.

In various implementations, platform 602 may include any combination of a chipset 605, processor 610, memory 612, antenna 613, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 610 may be dual-core processor(s), dual-core mobile processor(s), and so forth.

Memory 612 may be implemented as a volatile memory device such as, but not limited to, a Random Access Memory (RAM), Dynamic Random Access Memory (DRAM), or Static RAM (SRAM).

Storage 614 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 614 may include technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 may be integrated into processor 610 or chipset 605. In some implementations, graphics subsystem 615 may be a stand-alone device communicatively coupled to chipset 605.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 618 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In various implementations, display 620 may include any television type monitor or display. Display 620 may include, for example, a computer display screen, touch screen display, video monitor, television-like device, and/or a television. Display 620 may be digital and/or analog. In various implementations, display 620 may be a holographic display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display user interface 622 on display 620.

In various implementations, content services device(s) 630 may be hosted by any national, international and/or independent service and thus accessible to platform 602 via the Internet, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620.

In various implementations, content services device(s) 630 may include a cable television box, personal computer, network, telephone, Internet enabled devices or appliance capable of delivering digital information and/or content, and any other similar device capable of uni-directionally or bi-directionally communicating content between content providers and platform 602 and/display 620, via network 660 or directly. It will be appreciated that the content may be communicated uni-directionally and/or bi-directionally to and from any one of the components in system 600 and a content provider via network 660. Examples of content may include any media information including, for example, video, music, medical and gaming information, and so forth.

Content services device(s) 630 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 602 may receive control signals from navigation controller 650 having one or more navigation features. The navigation features of controller 650 may be used to interact with user interface 622, for example. In various embodiments, navigation controller 650 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be replicated on a display (e.g., display 620) by movements of a pointer, cursor, focus ring, or other visual indicators displayed on the display. For example, under the control of software applications 616, the navigation features located on navigation controller 650 may be mapped to virtual navigation features displayed on user interface 622, for example. In various embodiments, controller 650 may not be a separate component but may be integrated into platform 602 and/or display 620. The present disclosure, however, is not limited to the elements or in the context shown or described herein.

In various implementations, drivers (not shown) may include technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 even when the platform is turned "off." In addition, chipset 605 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the present disclosure.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
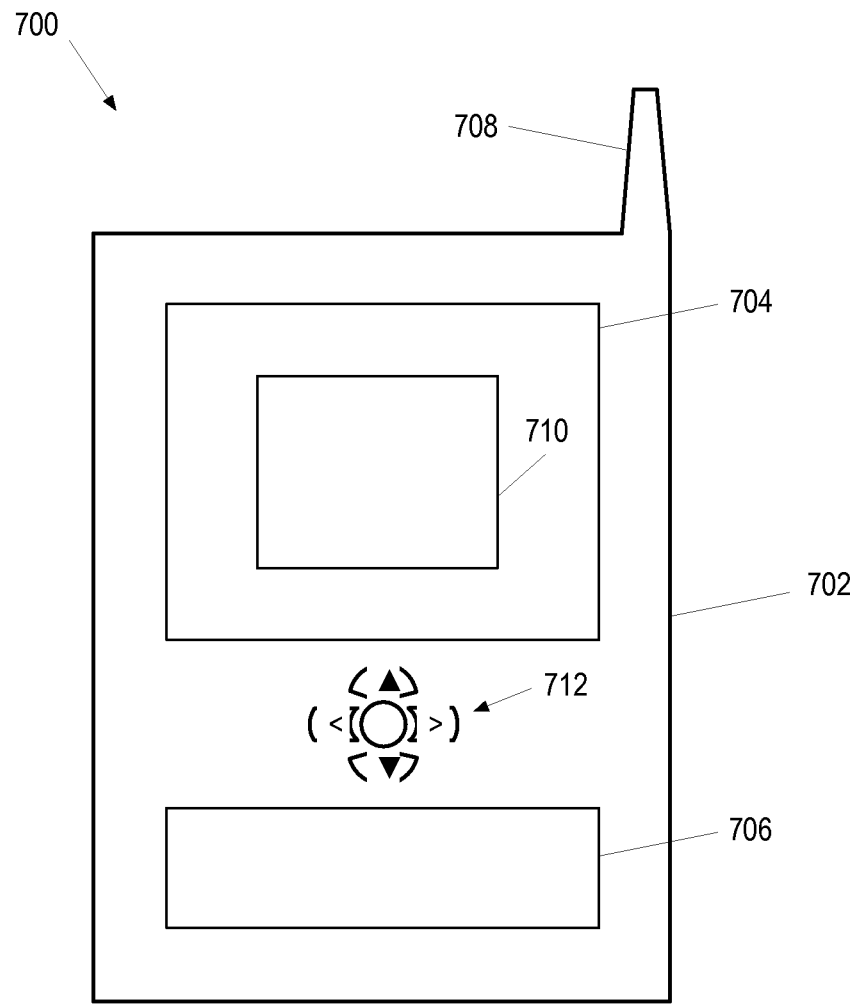
FIG. 7 illustrates an example device, all arranged in accordance with at least some implementations of the present disclosure.

As described above, system 600 may be embodied in varying physical styles or form factors. FIG. 7 illustrates implementations of a small form factor device 700 in which system 700 may be embodied. In various embodiments, for example, device 700 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may include a housing 702, a display 704, an input/output (I/O) device 706, and an antenna 708. Device 700 also may include navigation features 712. Display 704 may include any suitable display unit for displaying information appropriate for a mobile computing device. I/O device 706 may include any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a computer-implemented method for video coding comprises determining a first quantization parameter for a video frame of a video sequence, modifying the first quantization parameter based on at least one of a spatial complexity or a temporal complexity associated with the video frame to generate a second quantization parameter for the video frame, and generating a block level quantization parameter for an individual block of the video frame based on the second quantization parameter, a complexity of the individual block, and a complexity of the video frame.

Further to the first embodiments, the block level quantization parameter is greater than the second quantization parameter when a ratio of the complexity of the individual block to the complexity of the video frame is greater than one.

Further to the first embodiments, the first quantization parameter is based on a user selected constant quality factor for the video sequence.

Further to the first embodiments, the first quantization parameter is based on a constant quality factor for the video sequence and a frame type based offset.

Further to the first embodiments, the first quantization parameter is based on a user selected constant quality factor for the video sequence or wherein the first quantization parameter is based on a constant quality factor for the video sequence and a frame type based offset.

Further to the first embodiments, the spatial complexity comprises an intra prediction distortion based on the video frame.

Further to the first embodiments, the temporal complexity comprises an inter prediction distortion based on the video frame.

Further to the first embodiments, the spatial complexity comprises an intra prediction distortion based on the video frame and/or wherein the temporal complexity comprises an inter prediction distortion based on the video frame.

Further to the first embodiments, the second quantization parameter is greater than the first quantization parameter when the spatial complexity or the temporal complexity associated with the video frame indicates at least one of high spatial complexity or high temporal complexity, respectively.

Further to the first embodiments, the complexity of the individual block comprises at least one of a block prediction distortion of the individual block or a block variance of the individual block.

Further to the first embodiments, the video frame comprises an intra frame or a scene change P-frame, wherein the first quantization parameter is equal to a constant quality factor for the video sequence, wherein the second quantization parameter is proportional to the spatial complexity associated with the intra frame or the scene change P-frame, and wherein the block level quantization parameter is either equal to the second quantization parameter or less than the second quantization parameter based on a comparison of a ratio of the complexity of the individual block to the complexity of the intra frame or the scene change P-frame with a threshold.

Further to the first embodiments, the video frame comprises a P-frame, wherein the first quantization parameter is based on a constant quality factor for the video sequence increased by a P-frame offset and modified based on an intra frame quantization value for an I-frame associated with the inter P-frame, and wherein the second quantization parameter is based on the first quantization parameter adjusted based on a temporal ratio of the temporal complexity of the inter P-frame and a past average temporal complexity of the video sequence.

Further to the first embodiments, the video frame comprises an inter frame, wherein the block level quantization parameter is at least one of greater than the second quantization parameter based on a comparison of a ratio of the complexity of the individual block to the complexity of the inter frame with a first threshold or less than the second quantization parameter based on a comparison of the ratio of the complexity of the individual block to the complexity of the inter frame with a second threshold.

Further to the first embodiments, the method further comprises determining a third quantization parameter for a second video frame of the video sequence, wherein the second video frame is a B-frame, and wherein the third quantization parameter is based on the second quantization parameter.

Further to the first embodiments, the method further comprises determining a third quantization parameter for a second video frame of the video sequence, wherein the second video frame is a B-frame, and wherein the third quantization parameter is based on the second quantization parameter, wherein the B-frame is a B-reference frame, wherein the third quantization parameter is based on an average of the second quantization parameter, wherein the second quantization parameter comprises a P-frame reference quantization parameter, and a B-frame reference quantization parameter.

Further to the first embodiments, the method further comprises determining a third quantization parameter for a second video frame of the video sequence, wherein the second video frame is a B-frame, and wherein the third quantization parameter is based on the second quantization parameter, and/or wherein the B-frame is a B-reference frame, wherein the third quantization parameter is based on an average of the second quantization parameter, wherein the second quantization parameter comprises a P-frame reference quantization parameter, and a B-frame reference quantization parameter.

Further to the first embodiments, the method further comprises quantizing transform coefficients associated with the individual block based on the block level quantization parameter and encoding the quantized transform coefficients and the block level quantization parameter into a bitstream.

Further to the first embodiments, the method further comprises generating a mode selection associated with the video sequence based at least in part on the block level quantization parameter.

In one or more second embodiments, a system for providing video coding on a computing device comprises a memory configured to store video data and a graphics processing unit coupled to the memory, wherein the graphics processing unit comprises quantization parameter circuitry configured to determine a first quantization parameter for a video frame of a video sequence, modify the first quantization parameter based on at least one of a spatial complexity or a temporal complexity associated with the video frame to generate a second quantization parameter for the video frame, and generate a block level quantization parameter for an individual block of the video frame based on the second quantization parameter, a complexity of the individual block, and a complexity of the video frame, and quantization circuitry configured to quantizing transform coefficients associated with the individual block based on the block level quantization parameter to generate quantized transform coefficients.

Further to the second embodiments, the block level quantization parameter is greater than the second quantization parameter when a ratio of the complexity of the individual block to the complexity of the video frame is greater than one.

Further to the second embodiments, the video frame comprises an intra frame or a scene change P-frame, wherein the first quantization parameter is equal to a constant quality factor for the video sequence, wherein the second quantization parameter is proportional to the spatial complexity associated with the intra frame or the scene change P-frame, and wherein the block level quantization parameter is either equal to the second quantization parameter or less than the second quantization parameter based on a comparison of a ratio of the complexity of the individual block to the complexity of the intra frame or the scene change P-frame with a threshold.

Further to the second embodiments, the video frame comprises a P-frame, wherein the first quantization parameter is based on a constant quality factor for the video sequence increased by a P-frame offset and modified based on an intra frame quantization value for an I-frame associated with the inter P-frame, and wherein the second quantization parameter is based on the first quantization parameter adjusted based on a temporal ratio of the temporal complexity of the inter P-frame and a past average temporal complexity of the video sequence.

Further to the second embodiments, the video frame comprises an inter frame, wherein the block level quantization parameter is at least one of greater than the second quantization parameter based on a comparison of a ratio of the complexity of the individual block to the complexity of the inter frame with a first threshold or less than the second quantization parameter based on a comparison of the ratio of the complexity of the individual block to the complexity of the inter frame with a second threshold.

Further to the second embodiments, the quantization parameter circuitry is further configured to determine a third quantization parameter for a second video frame of the video sequence, wherein the second video frame is a B-frame, and wherein the third quantization parameter is based on the second quantization parameter.

Further to the second embodiments, the B-frame is a B-reference frame, wherein the third quantization parameter is based on an average of the second quantization parameter, wherein the second quantization parameter comprises a P-frame reference quantization parameter, and a B-frame reference quantization parameter.

In one or more third embodiments, a system for providing video coding on a computing device comprises a memory configured to store video data and a graphics processing unit coupled to the memory, wherein the graphics processing unit comprises means for determining a first quantization parameter for a video frame of a video sequence, means for modifying the first quantization parameter based on at least one of a spatial complexity or a temporal complexity associated with the video frame to generate a second quantization parameter for the video frame, and means for generating a block level quantization parameter for an individual block of the video frame based on the second quantization parameter, a complexity of the individual block, and a complexity of the video frame.

Further to the third embodiments, the video frame comprises a P-frame, wherein the first quantization parameter is based on a constant quality factor for the video sequence increased by a P-frame offset and modified based on an intra frame quantization value for an I-frame associated with the inter P-frame, and wherein the second quantization parameter is based on the first quantization parameter adjusted based on a temporal ratio of the temporal complexity of the inter P-frame and a past average temporal complexity of the video sequence.

Further to the third embodiments, the video frame comprises an inter frame, wherein the block level quantization parameter is at least one of greater than the second quantization parameter based on a comparison of a ratio of the complexity of the individual block to the complexity of the inter frame with a first threshold or less than the second quantization parameter based on a comparison of the ratio of the complexity of the individual block to the complexity of the inter frame with a second threshold.

In one or more fourth embodiments, a machine readable medium comprises a plurality of instructions that in response to being executed on a computing device, cause the computing device to perform video coding by determining a first quantization parameter for a video frame of a video sequence, modifying the first quantization parameter based on at least one of a spatial complexity or a temporal complexity associated with the video frame to generate a second quantization parameter for the video frame, and generating a block level quantization parameter for an individual block of the video frame based on the second quantization parameter, a complexity of the individual block, and a complexity of the video frame.

Further to the fourth embodiments, the video frame comprises an intra frame or a scene change P-frame, wherein the first quantization parameter is equal to a constant quality factor for the video sequence, wherein the second quantization parameter is proportional to the spatial complexity associated with the intra frame or the scene change P-frame, and wherein the block level quantization parameter is either equal to the second quantization parameter or less than the second quantization parameter based on a comparison of a ratio of the complexity of the individual block to the complexity of the intra frame or the scene change P-frame with a threshold.

Further to the fourth embodiments, the video frame comprises a P-frame, wherein the first quantization parameter is based on a constant quality factor for the video sequence increased by a P-frame offset and modified based on an intra frame quantization value for an I-frame associated with the inter P-frame, and wherein the second quantization parameter is based on the first quantization parameter adjusted based on a temporal ratio of the temporal complexity of the inter P-frame and a past average temporal complexity of the video sequence.

Further to the fourth embodiments, the video frame comprises an inter frame, wherein the block level quantization parameter is at least one of greater than the second quantization parameter based on a comparison of a ratio of the complexity of the individual block to the complexity of the inter frame with a first threshold or less than the second quantization parameter based on a comparison of the ratio of the complexity of the individual block to the complexity of the inter frame with a second threshold.

Further to the fourth embodiments, the machine readable medium comprises further instructions that in response to being executed on the computing device, cause the computing device to perform video coding by determining a third quantization parameter for a second video frame of the video sequence, wherein the second video frame is a B-frame, and wherein the third quantization parameter is based on the second quantization parameter.

In on or more fifth embodiments, at least one machine readable medium may include a plurality of instructions that in response to being executed on a computing device, causes the computing device to perform a method according to any one of the above embodiments.

In on or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video coding comprising:
   determining a first quantization parameter for a P-frame of a video sequence, wherein the first quantization parameter is based on a constant quality factor for the video sequence increased by a P-frame offset and modified based on an intra frame quantization value for an I-frame associated with the P-frame;
   modifying the first quantization parameter based on a temporal complexity associated with the P-frame to generate a second quantization parameter for the P-frame, wherein the second quantization parameter is based on the first quantization parameter adjusted based on a temporal ratio of the temporal complexity of the P-frame and a past average temporal complexity of the video sequence; and
   generating a block level quantization parameter for an individual block of the P-frame based on the second quantization parameter, a complexity of the individual block, and a complexity of the P-frame.

2. The method of claim 1, wherein the block level quantization parameter is greater than the second quantization parameter when a ratio of the complexity of the individual block to the complexity of the video frame is greater than one.

3. The method of claim 1, wherein the constant quality factor is a user selected constant quality factor for the video sequence.

4. The method of claim 1, wherein the temporal complexity comprises an inter prediction distortion based on the P-frame.

5. The method of claim 1, wherein the second quantization parameter is greater than the first quantization parameter when the temporal complexity associated with the P-frame indicates high temporal complexity.

6. The method of claim 1, wherein the complexity of the individual block comprises at least one of a block prediction distortion of the individual block or a block variance of the individual block.

7. The method of claim 1, wherein the block level quantization parameter is at least one of greater than the second quantization parameter based on a comparison of a ratio of the complexity of the individual block to the complexity of the P-frame with a first threshold or less than the second quantization parameter based on a comparison of the ratio of the complexity of the individual block to the complexity of the P-frame with a second threshold.

8. The method of claim 1, further comprising:
   determining a third quantization parameter for a B-frame of the video sequence based on the second quantization parameter.

9. The method of claim 8, wherein the B-frame is a B-reference frame, wherein the third quantization parameter is based on an average of the second quantization parameter, wherein the second quantization parameter comprises a P-frame reference quantization parameter, and a B-frame reference quantization parameter.

10. The method of claim 1, further comprising:
    quantizing transform coefficients associated with the individual block based on the block level quantization parameter; and
    encoding the quantized transform coefficients and the block level quantization parameter into a bitstream.

11. The method of claim 1, further comprising:
    generating a mode selection associated with the video sequence based at least in part on the block level quantization parameter.

12. A system for providing video coding on a computing device, comprising:
    a memory configured to store video data; and
    a processor coupled to the memory, the processor to:
      determine a first quantization parameter for a P-frame of a video sequence, wherein the first quantization parameter is based on a constant quality factor for the video sequence increased by a P-frame offset and modified based on an intra frame quantization parameter for an I-frame associated with the P-frame;
      modify the first quantization parameter based on a temporal complexity associated with the P-frame to generate a second quantization parameter for the P-frame, wherein the second quantization parameter is based on the first quantization parameter adjusted based on a temporal ratio of the temporal complexity of the P-frame and a past average temporal complexity of the video sequence; and generate a block level quantization parameter for an individual block of the P-frame based on the second quantization parameter, a complexity of the individual block, and a complexity of the P-frame; and quantize transform coefficients associated with the individual block based on the block level quantization parameter to generate quantized transform coefficients.

13. The system of claim 12, wherein the block level quantization parameter is greater than the second quantization parameter when a ratio of the complexity of the individual block to the complexity of the P-frame is greater than one.

14. The system of claim 12, wherein the processor is further to:
encode the quantized transform coefficients and the block level quantization parameter into a bitstream.

15. The system of claim 12, wherein the temporal complexity comprises an inter prediction distortion based on the P-frame and the complexity of the individual block comprises at least one of a block prediction distortion of the individual block or a block variance of the individual block.

16. The system of claim 12, wherein the block level quantization parameter is at least one of greater than the second quantization parameter based on a comparison of a ratio of the complexity of the individual block to the complexity of the P-frame with a first threshold or less than the second quantization parameter based on a comparison of the ratio of the complexity of the individual block to the complexity of the P-frame with a second threshold.

17. At least one non-transitory machine readable medium comprising a plurality of instructions that in response to being executed on a computing device, cause the computing device to perform video coding by:
determining a first quantization parameter for a P-frame of a video sequence, wherein the first quantization parameter is based on a constant quality factor for the video sequence increased by a P-frame offset and modified based on an intra frame quantization value for an I-frame associated with the P-frame;
modifying the first quantization parameter based on a temporal complexity associated with the P-frame to generate a second quantization parameter for the P-frame, wherein the second quantization parameter is based on the first quantization parameter adjusted based on a temporal ratio of the temporal complexity of the P-frame and a past average temporal complexity of the video sequence; and
generating a block level quantization parameter for an individual block of the P-frame based on the second quantization parameter, a complexity of the individual block, and a complexity of the P-frame.

18. The machine readable medium of claim 17, comprising further instructions that in response to being executed on the computing device, cause the computing device to perform video coding by:
quantizing transform coefficients associated with the individual block based on the block level quantization parameter; and
encoding the quantized transform coefficients and the block level quantization parameter into a bitstream.

19. The machine readable medium of claim 17, wherein the temporal complexity comprises an inter prediction distortion based on the P-frame and the complexity of the individual block comprises at least one of a block prediction distortion of the individual block or a block variance of the individual block.

20. The machine readable medium of claim 17, wherein the block level quantization parameter is at least one of greater than the second quantization parameter based on a comparison of a ratio of the complexity of the individual block to the complexity of the P-frame with a first threshold or less than the second quantization parameter based on a comparison of the ratio of the complexity of the individual block to the complexity of the P-frame with a second threshold.

21. The machine readable medium of claim 17 comprising further instructions that in response to being executed on the computing device, cause the computing device to perform video coding by:
determining a third quantization parameter for B-reference frame of the video sequence based on the second quantization parameter, wherein the third quantization parameter is based on an average of the second quantization parameter, wherein the second quantization parameter comprises a P-frame reference quantization parameter, and a B-frame reference quantization parameter.

22. A system for providing video coding on a computing device, comprising:
a memory configured to store video data; and
a processor coupled to the memory, the processor to:
determine a first quantization parameter for a first video frame of a video sequence;
modify the first quantization parameter based on at least one of a spatial complexity or a temporal complexity associated with the first video frame to generate a second quantization parameter for the video frame;
generate a block level quantization parameter for an individual block of the video frame based on the second quantization parameter, a complexity of the individual block, and a complexity of the video frame; and
determine a third quantization parameter for a B-reference frame of the video sequence based on the second quantization parameter, wherein the second quantization parameter comprises a P-frame reference quantization parameter, and wherein the third quantization parameter is based on an average of the second quantization parameter and a B-frame reference quantization parameter.

23. The system of claim 22, wherein the block level quantization parameter is greater than the second quantization parameter when a ratio of the complexity of the individual block to the complexity of the video frame is greater than one.

24. The system of claim 22, wherein the spatial complexity comprises an intra prediction distortion based on the video frame or the temporal complexity comprises an inter prediction distortion based on the video frame.

25. The system of claim 22, wherein the processor is further to:
quantize transform coefficients associated with the individual block based on the block level quantization parameter; and encode the quantized transform coefficients and the block level quantization parameter into a bitstream.

\* \* \* \* \*